(12) United States Patent
Wang et al.

(10) Patent No.: US 11,245,926 B2
(45) Date of Patent: Feb. 8, 2022

(54) METHODS AND APPARATUS FOR TRACK DERIVATION FOR IMMERSIVE MEDIA DATA TRACKS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/821,685

(22) Filed: Mar. 17, 2020

(65) Prior Publication Data

US 2020/0304834 A1 Sep. 24, 2020

Related U.S. Application Data

(60) Provisional application No. 62/821,508, filed on Mar. 21, 2019, provisional application No. 62/820,373, filed on Mar. 19, 2019.

(51) Int. Cl.
*G06F 15/16* (2006.01)
*H04N 19/597* (2014.01)
(Continued)

(52) U.S. Cl.
CPC ......... *H04N 19/597* (2014.11); *H04N 19/172* (2014.11); *H04N 19/1883* (2014.11); *H04N 21/83* (2013.01); *H04N 21/85* (2013.01)

(58) Field of Classification Search
CPC ............................... H04N 21/83; H04N 21/85
See application file for complete search history.

(56) References Cited

U.S. PATENT DOCUMENTS 9,002,991 B2 4/2015 Fletcher
2010/0189424 A1* 7/2010 Doehla ............ H04N 21/23614
386/241
(Continued)

OTHER PUBLICATIONS

[No Author Listed], Information technology—Coded representation of immersive media—Part 10: Carriage of Point Cloud Data. ISO/IEC JTC1/SC29/WG11. ISO 23090-10:2019(E):13 pages.
(Continued)

*Primary Examiner* — Hieu T Hoang
(74) *Attorney, Agent, or Firm* — Wolf, Greenfield & Sacks, P.C.

(57) ABSTRACT

The techniques described herein relate to methods, apparatus, and computer readable media configured to encode and/or decode video data. Immersive media data is accessed that comprises a hierarchical track structure comprising at least (a) a first track at a first level of the hierarchical track structure comprising first immersive media elementary data, wherein the first track is a parameter track, and the first immersive media elementary data comprises timed metadata, and (b) a second track at a second level in the hierarchical track structure that is different than the first level of the first track, the second track comprising metadata specifying an immersive media track derivation operation. The immersive media track derivation operation is performed on at least the first immersive media elementary data to generate composite immersive media data for the second track.

20 Claims, 15 Drawing Sheets

(51) Int. Cl.
  *H04N 19/172* (2014.01)
  *H04N 19/169* (2014.01)
  *H04N 21/83* (2011.01)
  *H04N 21/85* (2011.01)

(56) References Cited

U.S. PATENT DOCUMENTS

| | | | |
|---|---|---|---|
| 2012/0023250 A1* | 1/2012 | Chen | H04N 21/23608 709/231 |
| 2016/0232939 A1* | 8/2016 | Malamal Vadakital | G11B 27/031 |
| 2016/0342596 A1* | 11/2016 | Aksu | H04N 9/8205 |
| 2017/0237965 A1* | 8/2017 | Wang | H04N 21/85406 348/42 |
| 2017/0347100 A1 | 11/2017 | Chou et al. | |
| 2018/0268570 A1 | 9/2018 | Budagavi et al. | |
| 2019/0052937 A1* | 2/2019 | Malamal Vadakital | H04L 65/607 |
| 2020/0099997 A1* | 3/2020 | Denoual | H04N 21/234345 |
| 2020/0107008 A1* | 4/2020 | Hur | H04N 13/161 |
| 2020/0112709 A1 | 4/2020 | Lim | |
| 2020/0120326 A1* | 4/2020 | Deshpande | H04N 21/8456 |
| 2020/0153884 A1 | 5/2020 | Hernandez | |
| 2020/0153885 A1* | 5/2020 | Lee | G06T 9/001 |
| 2020/0250003 A1 | 8/2020 | Yang et al. | |
| 2020/0250891 A1* | 8/2020 | Curcio | H04N 21/8586 |
| 2020/0260063 A1* | 8/2020 | Hannuksela | H04N 13/161 |
| 2020/0294271 A1 | 9/2020 | Ilola et al. | |
| 2020/0296350 A1 | 9/2020 | Oh | |
| 2020/0296394 A1 | 9/2020 | Choi et al. | |
| 2020/0344493 A1 | 10/2020 | Fleureau et al. | |
| 2021/0112233 A1* | 4/2021 | Hannuksela | H04N 13/183 |
| 2021/0152808 A1 | 5/2021 | He et al. | |
| 2021/0176509 A1* | 6/2021 | Maze | H04N 21/85406 |
| 2021/0194946 A1* | 6/2021 | Hannuksela | H04N 21/85406 |
| 2021/0195162 A1 | 6/2021 | Chupeau et al. | |

OTHER PUBLICATIONS

[No Author Listed], Information technology—Coding of audio-visual objects—Part 12: ISO base media file format. ISO/IEC 14496-12, Fifth Edition. Feb. 20, 2015: 286 pages.

Jang et al., Description of PCC Core Experiment 2.19 on V-PCC tiles. International Organisation for Standardisation, Coding of Moving Pictures and Audio, ISO/IEC JTC1/SC29/WG11, MPEG2019/N18188. Jan. 2019:12 pages.

Mammou et al., Study Text of ISO/IEC CD 23090-5: Video-based Point Cloud Compression. International Organisation for Standardisation, Coding of Moving Pictures and Audio, ISO/IEC JTC1/SC29/WG11, N18180. Jan. 2019:102 pages.

Schwarz et al., Emerging MPEG standards for point cloud compression. IEEE Journal on Emerging and Selected Topics in Circuits and Systems. Mar. 2019; 9(1):133-48.

Singer et al., Technologies under Consideration for ISOBMFF. International Organisation for Standardisation, Coding of Moving Pictures and Audio, ISO/IEC JTC1/SC29/WG11, MPEG2018/N18240. Jan. 2019:62 pages.

Wang et al., Media Processing related Track Derivations in ISOBMFF, International Organisation for Standardisation, Coding of Moving Pictures and Audio, ISO/IEC JTC1/SC29/WG11, MPEG2016/M44800. Oct. 2018: 17 pages.

Wang et al., Signaling of 2D and 3D Spatial Relationship and Sample groups for V-PCC Visual (Sub-Picture and Sub-Volumetric) Tracks in ISOBMFF. International Organisation for Standardisation, Coding of Moving Pictures and Audio, ISO/IEC JTC1/SC29/WG11, MPEG2019/m47335. Mar. 2019: 12 pages.

Wang et al., Timed Metadata for (Recommended) Viewports of V-PCC Content in ISOBMFF. International Organisation for Standardisation, Coding of Moving Pictures and Audio, ISO/IEC JTC1/SC29/WG11, MPEG2016/M46208. Jan. 2019:11 pages.

Wang et al., Track Derivation for Storage of V-PCC Content in ISOBMFF. International Organisation for Standardisation, Coding of Moving Pictures and Audio, ISO/IEC JTC1/SC29/WG11, MPEG2016/M46207. Jan. 2019:6 pages.

Wang et al., WD 4 of ISO/IEC 23090-2 OMAF 2nd edition. International Organisation for Standardisation, Coding of Moving Pictures and Audio, ISO/IEC JTC1/SC29/WG11, N18227-v1. Jan. 2019:227 pages.

* cited by examiner

```
aligned(8) class V-PCC2DGridComposition
extends TransformProperty ('2dpc') {
    unsigned int(4) version = 0;
    unsigned int(4) flags;
    FieldLength = ((flags & 1) + 1) * 16;
    unsigned int(FieldLength) output_width;
    unsigned int(FieldLength) output_height;
    unsigned int(8) rows_minus_one;
    unsigned int(8) columns_minus_one;
}
```

FIG. 12

```
aligned(8) class V-PCC3DMeshComposition
extends TransformProperty ('3dpc') {         ← 1302
    unsigned int(4) version = 0;             ← 1304
    unsigned int(4) flags;                   ← 1306
    FieldLength = ((flags & 1) + 1) * 16;    ← 1308
    unsigned int(FieldLength) output_width;  ← 1310
    unsigned int(FieldLength) output_height; ← 1312
    unsigned int(FieldLength) output_depth;  ← 1314
    unsigned int(8) rows_minus_one;          ← 1316
    unsigned int(8) columns_minus_one;       ← 1318
    unsigned int(8) layers_minus_one;
}
```

FIG. 13

METHODS AND APPARATUS FOR TRACK DERIVATION FOR IMMERSIVE MEDIA DATA TRACKS

RELATED APPLICATIONS

This Application claims priority under 35 U.S.C. § 119(e) to U.S. Provisional Application Ser. No. 62/821,508, titled "METHODS OF VISUAL TRACK DERIVATION IN ISOBMFF," filed on Mar. 21, 2019 and U.S. Provisional Application Ser. No. 62/820,373, titled "METHODS OF TRACK DERIVATION FOR STORAGE OF TILED V-PCC CONTENT IN ISOBMF," filed on Mar. 19, 2019, which are herein incorporated by reference in their entirety.

TECHNICAL FIELD

The techniques described herein relate generally to video coding, and particularly to methods and apparatus for track derivation techniques for immersive media tracks (e.g., point cloud multimedia, 3D immersive media, and/or the like), including track derivation techniques for the storage of tiled Video-based Point Cloud Compression (V-PCC) content in formats such as the ISO Base Media File Format (ISOBMFF).

BACKGROUND OF INVENTION

Various types of video content, such as 2D content, 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangle projection can be used to put the spherical map into a two-dimensional image. This can be done, for example, to use two-dimensional encoding and compression techniques. Ultimately, the encoded and compressed content is stored and delivered using a desired delivery mechanism (e.g., thumb drive, digital video disk (DVD) and/or online streaming). Such video can be used for virtual reality (VR), and/or 3D video.

At the client side, when the client processes the content, a video decoder decodes the encoded video and performs a reverse-projection to put the content back onto the sphere. A user can then view the rendered content, such as using a head-worn viewing device. The content is often rendered according to the user's viewport, which represents the angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder does not know what the user will actually view, then the whole encoding and decoding process will process the entire spherical content. This can allow, for example, the user to view the content at any particular viewport and/or area, since all of the spherical content is delivered and decoded.

However, processing all of the spherical content can be compute intensive and can consume significant bandwidth. For example, for online streaming applications, processing all of the spherical content can place a large burden on network bandwidth. Therefore, it can be difficult to preserve a user's experience when bandwidth resources and/or compute resources are limited. Some techniques only process the content being viewed by the user. For example, if the user is viewing the front (e.g., or north pole), then there is no need to deliver the back part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for processing (e.g., encoding or decoding) point cloud video data and/or other 3D immersive media in a hierarchical structure carries the point cloud video data in elementary tracks. In some embodiments, the point cloud video data includes 2D and/or 3D point cloud data. The point cloud video data can be partitioned into regions or groups of 2D tracks (e.g., sub-picture tracks) and/or 3D tracks (e.g., sub-volumetric tracks). The techniques provide for encoding composite tracks of the elementary tracks using point cloud derivation operations to generate composite point cloud content from the associated sets of one or more input tracks.

Some embodiments relate to a decoding method for decoding video data for immersive media. The method includes accessing immersive media data comprising a hierarchical track structure comprising at least (a) a first track at a first level of the hierarchical track structure comprising first immersive media elementary data, wherein the first track is a parameter track, and the first immersive media elementary data comprises timed metadata, and (b) a second track at a second level in the hierarchical track structure that is different than the first level of the first track, the second track comprising metadata specifying an immersive media track derivation operation. The method includes performing the immersive media track derivation operation on at least the first immersive media elementary data to generate composite immersive media data for the second track.

According to some examples, the immersive media comprises point cloud multimedia.

According to some examples, the first level of the hierarchical track structure further comprises at least one geometry track comprising geometry data of the immersive media, at least one attribute track comprising attribute data of the immersive media, and an occupancy track comprising occupancy map data of the immersive media, and accessing the immersive media data comprises accessing the geometry data in the at least one geometry track, the attribute data in the at least one attribute track, and the occupancy map data of the occupancy track, and performing the immersive media track derivation operation comprises performing the immersive media track derivation operation on the timed metadata, the geometry data, the attribute data, and the occupancy map data, to generate the composite immersive media data for the second track.

According to some examples, the first immersive media elementary data of the first track comprises a two-dimensional (2D) sub-picture track, the metadata specifying the immersive media track derivation operation specifies a 2D immersive media track derivation operation, and performing the immersive media track derivation comprises performing the 2D immersive media track derivation operation on at least the 2D sub-picture track to generate a derived 2D immersive media track. The metadata specifying the 2D immersive media track derivation operation can specify a width of a reconstructed component sample of the derived 2D immersive media track on which samples of at least the 2D sub-picture track are placed for the 2D immersive media track derivation operation, and a height of the reconstructed component sample of the derived 2D immersive media track. The metadata specifying the 2D immersive media track derivation operation can specify a number of rows of input samples of the first input track and any other input tracks, and a number of input samples of the first input track and the any other input tracks per row. The metadata specifying the 2D immersive media track derivation operation can specify a number of rows of input samples of the first input track and any other input tracks, a number of input samples of the first input track and the any other input tracks per row, and a number of component samples of the first input track and the any other input tracks per row and column.

According to some examples, the first immersive media elementary data of the first track is a three-dimensional (3D) sub-volumetric track, the metadata specifying the immersive media track derivation operation specifies a 3D immersive media track derivation operation, and performing the immersive media track derivation comprises performing the 3D immersive media track derivation operation on at least the 3D sub-volumetric track to generate a derived 3D immersive media track. The at least one geometry track can include geometry data for generating the derived 3D immersive media track, the at least one attribute track can include attribute data for generating the derived 3D immersive media track, and the occupancy track can include occupancy map data for generating the derived 3D immersive media track. The metadata specifying the 3D immersive media track derivation operation can specify a width of a reconstructed component sample of the derived 3D immersive media track on which samples of at least the 3D sub-volumetric track are placed for the 3D immersive media track derivation operation, a height of the reconstructed component sample of the derived 3D immersive media track, and a depth of the reconstructed component sample of the derived 3D immersive media track.

Some embodiments relate to a method for encoding video data. The method includes encoding immersive media video data comprising encoding immersive media data comprising a hierarchical track structure, comprising encoding at least (a) a first track at a first level of the hierarchical track structure comprising first immersive media elementary data, wherein the first track is a parameter track, and the first immersive media elementary data comprises timed metadata, and (b) a second track at a second level in the hierarchical track structure that is different than the first level of the first track, the second track comprising metadata specifying an immersive media track derivation operation on at least the first immersive media elementary data to generate composite immersive media data for the second track.

Some embodiments relate to an apparatus configured to decode video data. The apparatus includes a processor in communication with memory. The processor is configured to execute instructions stored in the memory that cause the processor to perform accessing immersive media data comprising a hierarchical track structure comprising at least (a) a first track at a first level of the hierarchical track structure comprising first immersive media elementary data, wherein the first track is a parameter track, and the first immersive media elementary data comprises timed metadata, and (b) a second track at a second level in the hierarchical track structure that is different than the first level of the first track, the second track comprising metadata specifying an immersive media track derivation operation, and performing the immersive media track derivation operation on at least the first immersive media elementary data to generate composite immersive media data for the second track.

According to some examples, the immersive media comprises point cloud multimedia.

According to some examples, the first level of the hierarchical track structure further comprises at least one geometry track comprising geometry data of the immersive media, at least one attribute track comprising attribute data of the immersive media, and an occupancy track comprising occupancy map data of the immersive media, and accessing the immersive media data comprises accessing the geometry data in the at least one geometry track, the attribute data in the at least one attribute track, and the occupancy map data of the occupancy track, and performing the immersive media track derivation operation comprises performing the immersive media track derivation operation on the timed metadata, the geometry data, the attribute data, and the occupancy map data, to generate the composite immersive media data for the second track.

According to some examples, the first immersive media elementary data of the first track comprises a two-dimensional (2D) sub-picture track, the metadata specifying the immersive media track derivation operation specifies a 2D immersive media track derivation operation, and performing the immersive media track derivation comprises performing the 2D immersive media track derivation operation on at least the 2D sub-picture track to generate a derived 2D immersive media track. The metadata can specify the 2D immersive media track derivation operation specifies a width of a reconstructed component sample of the derived 2D immersive media track on which samples of at least the 2D sub-picture track are placed for the 2D immersive media track derivation operation, and a height of the reconstructed component sample of the derived 2D immersive media track. The metadata specifying the 2D immersive media track derivation operation can specify a number of rows of input samples of the first input track and any other input tracks, and a number of input samples of the first input track and the any other input tracks per row.

According to some examples, the first immersive media elementary data of the first track is a three-dimensional (3D) sub-volumetric track, the metadata specifying the immersive media track derivation operation specifies a 3D immersive media track derivation operation, and performing the immersive media track derivation comprises performing the 3D immersive media track derivation operation on at least the 3D sub-volumetric track to generate a derived 3D immersive media track. The at least one geometry track can include geometry data for generating the derived 3D immersive media track, the at least one attribute track can include attribute data for generating the derived 3D immersive media track, and the occupancy track can include occupancy map data for generating the derived 3D immersive media track. The metadata specifying the 3D immersive media track derivation operation can specify a width of a reconstructed component sample of the derived 3D immersive media track on which samples of at least the 3D sub-volumetric track are placed for the 3D immersive media track derivation operation, a height of the reconstructed component sample of the derived 3D immersive media track, and a depth of the reconstructed component sample of the derived 3D immersive media track.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 12 is an exemplary syntax for a 2D point cloud composition, according to some embodiments.

FIG. 13 is an exemplary syntax for a 3D point cloud composition, according to some embodiments.

DETAILED DESCRIPTION OF INVENTION

Point cloud data or other immersive media, such as Video-based Point Cloud Compression (V-PCC), data can provide compressed point cloud data for various types of 3D multimedia applications. Conventional storage structures for point cloud content present the point cloud content (e.g., V-PCC component tracks) as a collection of component data tracks (e.g., geometry, texture, and/or occupancy tracks). Such conventional techniques do not include a single visual media track that can represent the renderable V-PCC media content. Further, techniques do not provide for track derivation operations for point cloud content. The inventors have appreciated that it is desirable to provide techniques for encoding and/or decoding point cloud video data using a hierarchical track structure that supports derivation operations for point cloud content. The techniques described herein provide for a new point cloud content structure that leverages a track hierarchy to derive point cloud content based on a set of input elementary streams (e.g., which can include 2D and/or 3D point cloud content). The techniques further provide for specifying track derivation operations and constructing composite point cloud tracks from sub-tracks, including constructing V-PCC media tracks from sub-divided 2D sub-picture and 3D sub-region V-PCC tracks. The techniques can be used to improve viewport-dependent point cloud media processing, to associate metadata with a composite track (e.g., rather than with individual sub-tracks), and/or the like.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
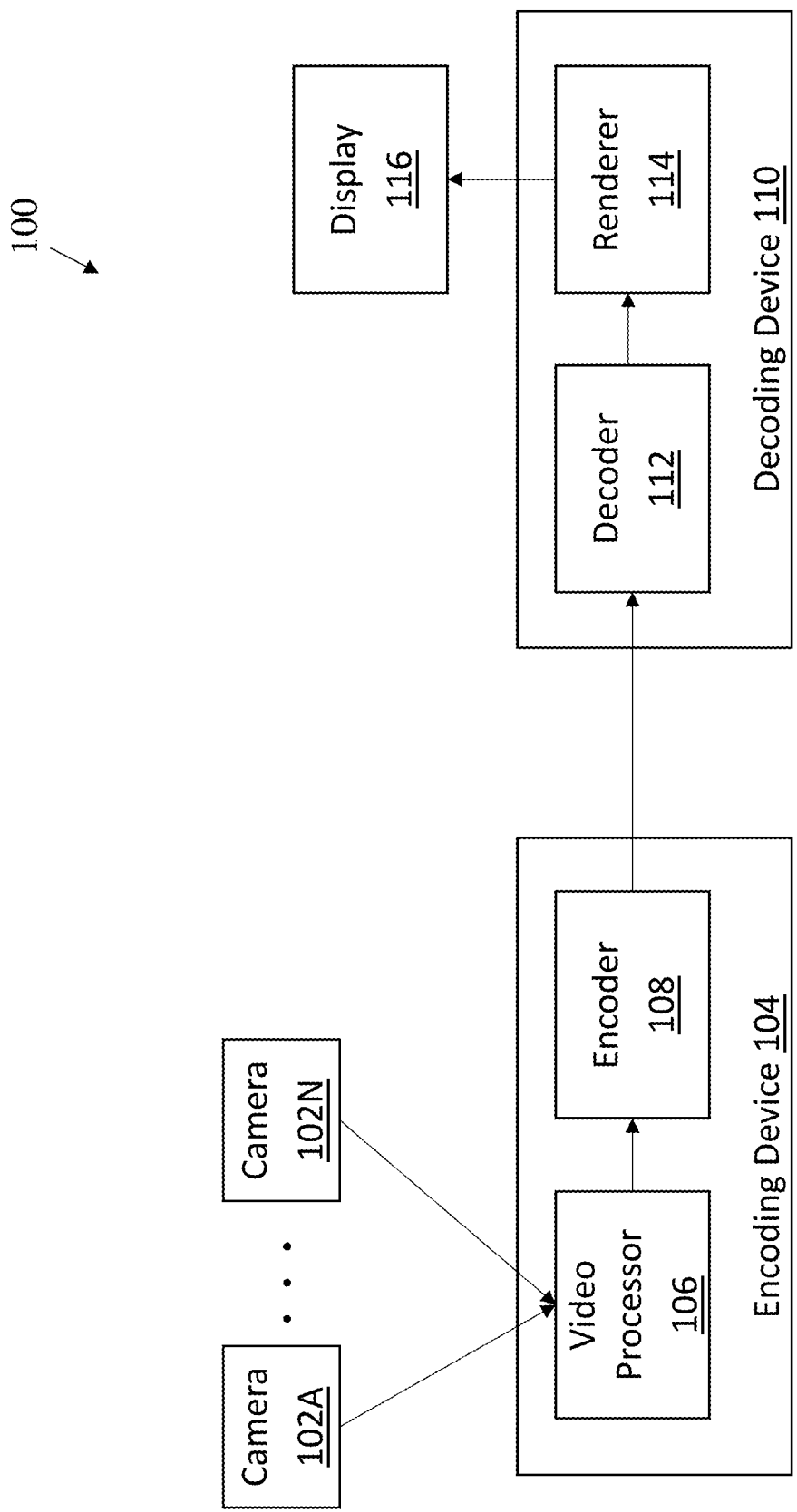
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
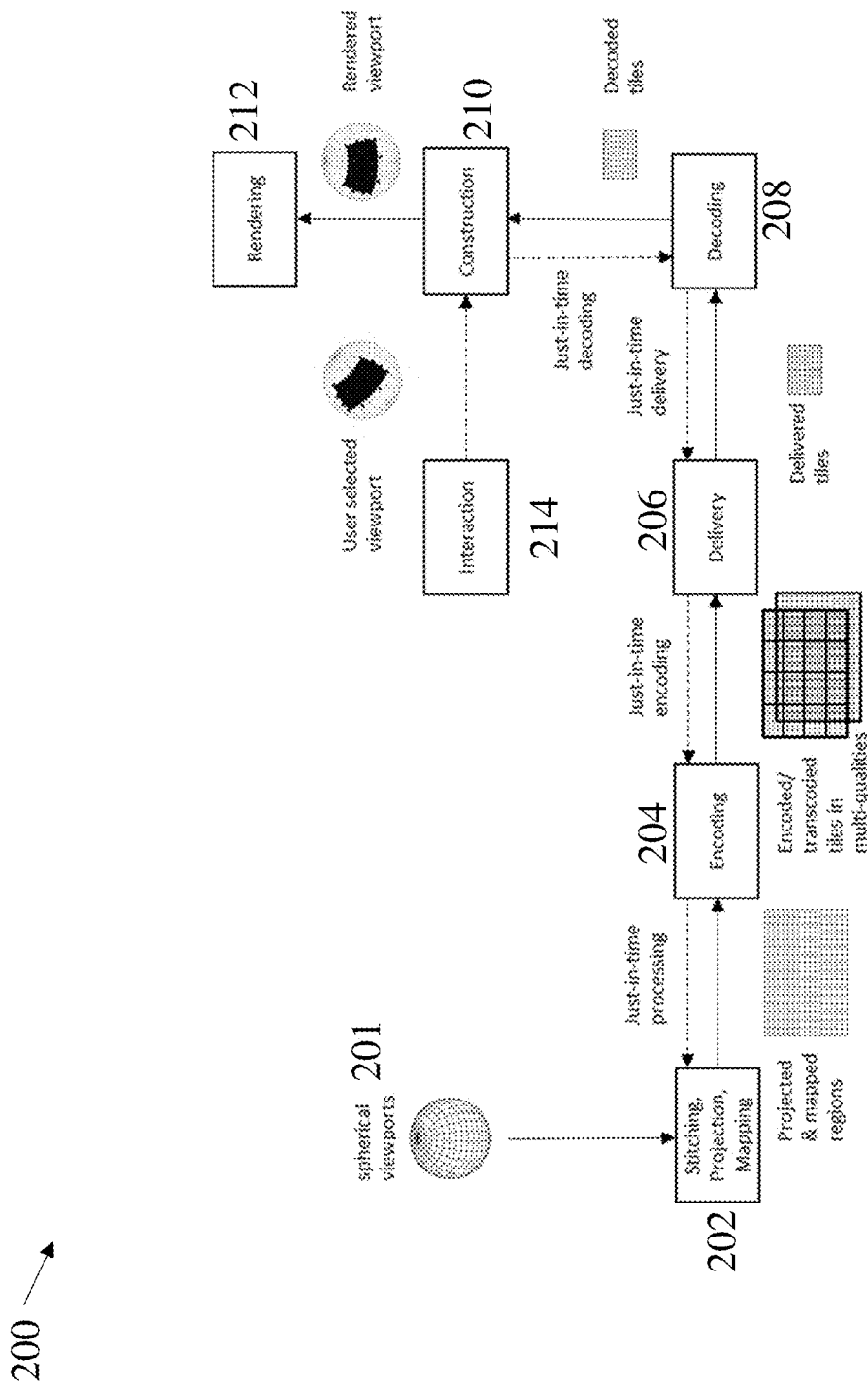
FIG. 2 shows a viewport dependent content flow process for VR content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

A region of interest (ROI) is somewhat similar in concept to viewport. An ROI may, for example, represent a region in 3D or 2D encodings of omnidirectional video. An ROI can have different shapes (e.g., a square, or a circle), which can be specified in relation to the 3D or 2D video (e.g., based on location, height, etc.). For example, a region of interest can represent an area in a picture that can be zoomed-in, and corresponding ROI video can be displayed for the zoomed-in video content. In some implementations, the ROI video is already prepared. In such implementations, a region of interest typically has a separate video track that carries the ROI content. Thus, the encoded video specifies the ROI, and how the ROI video is associated with the underlying video. The techniques described herein are described in terms of a region, which can include a viewport, a ROI, and/or other areas of interest in video content.

ROI or viewport tracks can be associated with main video. For example, an ROI can be associated with a main video to facilitate zoom-in and zoom-out operations, where the ROI is used to provide content for a zoom-in region. For example, MPEG-B, Part 10, entitled "Carriage of Timed Metadata Metrics of Media in ISO Base Media File Format," dated Jun. 2, 2016 (w16191, also ISO/IEC 23001-10:2015), which is hereby incorporated by reference herein in its entirety, describes an ISO Base Media File Format (ISOBMFF) file format that uses a timed metadata track to signal that a main 2D video track has a 2D ROI track. As another example, Dynamic Adaptive Streaming over HTTP (DASH) includes a spatial relationship descriptor to signal the spatial relationship between a main 2D video representation and its associated 2D ROI video representations. ISO/IEC 23009-1, draft third edition (w10225), Jul. 29, 2016, addresses DASH, and is hereby incorporated by reference herein in its entirety. As a further example, the Omnidirectional MediA Format (OMAF) is specified in ISO/IEC 23090-2, which is hereby incorporated by reference herein in its entirety. OMAF specifies the omnidirectional media format for coding, storage, delivery, and rendering of omnidirectional media. OMAF specifies a coordinate system, such that the user's viewing perspective is from the center of a sphere looking outward towards the inside surface of the sphere. OMAF includes extensions to ISOBMFF for omnidirectional media as well as for timed metadata for sphere regions.

When signaling an ROI, various information may be generated, including information related to characteristics of the ROI (e.g., identification, type (e.g., location, shape, size), purpose, quality, rating, etc.). Information may be generated to associate content with an ROI, including with the visual (3D) spherical content, and/or the projected and mapped (2D) frame of the spherical content. An ROI can be characterized by a number of attributes, such as its identification, location within the content it is associated with, and its shape and size (e.g., in relation to the spherical and/or 3D content). Additional attributes like quality and rate ranking of the region can also be added, as discussed further herein.

Point cloud data can include a set of 3D points in a scene. Each point can be specified based on an (x, y, z) position and color information, such as (R,V,B), (Y,U,V), reflectance, transparency, and/or the like. The point cloud points are typically not ordered, and typically do not include relations with other points (e.g., such that each point is specified without reference to other points). Point cloud data can be useful for many applications, such as 3D immersive media experiences that provide 6DoF. However, point cloud information can consume a significant amount of data, which in turn can consume a significant amount of bandwidth if being transferred between devices over network connections. For example, 800,000 points in a scene can consume 1 Gbps, if uncompressed. Therefore, compression is typically needed in order to make point cloud data useful for network-based applications.

Figure 3:
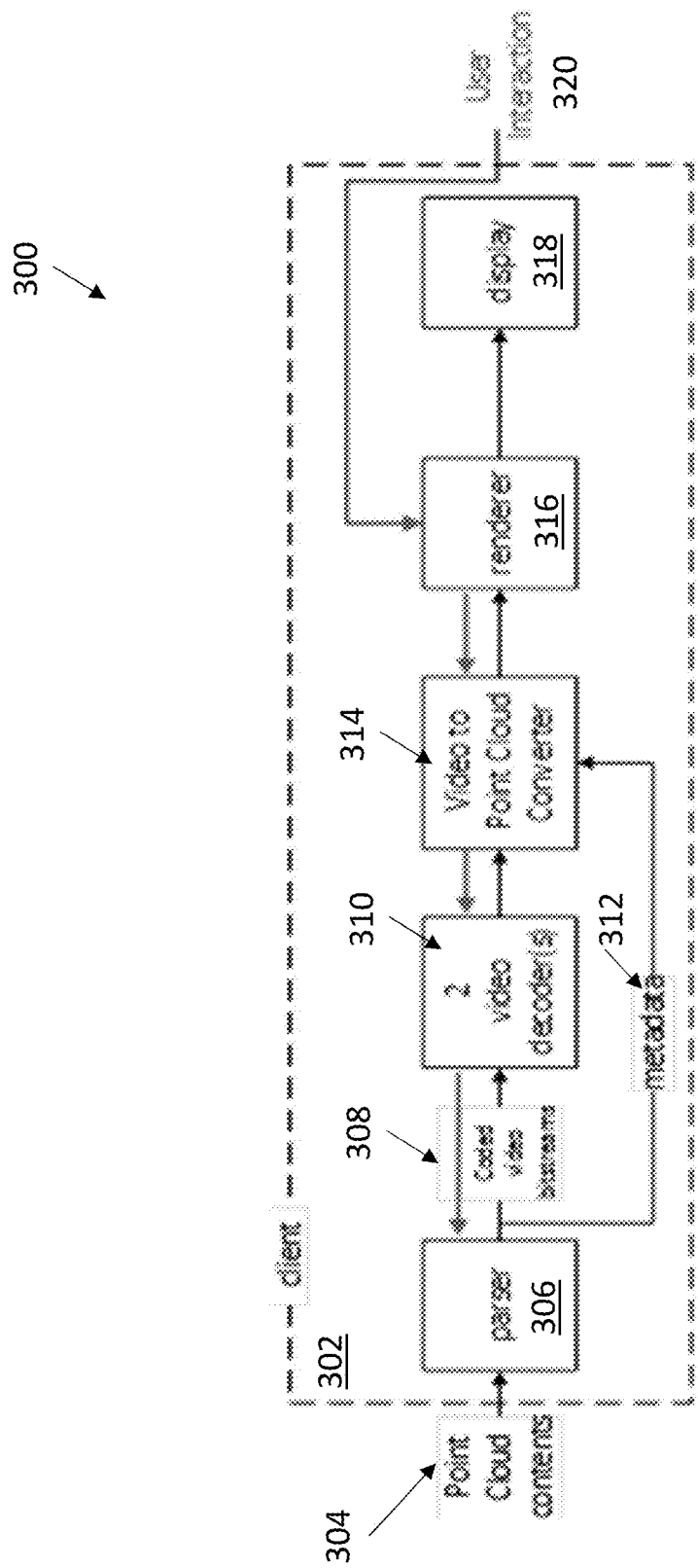
FIG. 3 shows an exemplary processing flow for point cloud content, according to some examples.

MPEG has been working on point cloud compression to reduce the size of point cloud data, which can enable streaming of point cloud data in real-time for consumption on other devices. FIG. 3 shows an exemplary processing flow 300 for point cloud content as a specific instantiation of the general viewport/ROI (e.g., 3DoF/6DoF) processing model, according to some examples. The processing flow 300 is described in further detail in, for example, N17771, "PCC WD V-PCC (Video-based PCC)," July 2018, Ljubljana, SI, which is hereby incorporated by reference herein in its entirety. The client 302 receives the point cloud media content file 304, which is composed of two 2D planar video bitstreams and metadata that specifies a 2D planar video to 3D volumetric video conversion. The content 2D planar video to 3D volumetric video conversion metadata can be located either at the file level as timed metadata track(s) or inside the 2D video bitstream as SEI messages.

The parser module 306 reads the point cloud contents 304. The parser module 306 delivers the two 2D video bitstreams 308 to the 2D video decoder 310. The parser module 306 delivers the 2D planar video to 3D volumetric video conversion metadata 312 to the 2D video to 3D point cloud converter module 314. The parser module 306 at the local client can deliver some data that requires remote rendering (e.g., with more computing power, specialized rendering engine, and/or the like) to a remote rendering module (not shown) for partial rendering. The 2D video decoder module 310 decodes the 2D planar video bistreams 308 to generate 2D pixel data. The 2D video to 3D point cloud converter module 314 converts the 2D pixel data from the 2D video decoder(s) 310 to 3D point cloud data if necessary using the metadata 312 received from the parser module 306.

The renderer module 316 receives information about users' 6 degree viewport information and determines the portion of the point cloud media to be rendered. If a remote renderer is used, the users' 6DoF viewport information can also be delivered to the remote render module. The renderer module 316 generates point cloud media by using 3D data, or a combination of 3D data and 2D pixel data. If there are partially rendered point cloud media data from a remote renderer module, then the renderer 316 can also combine such data with locally rendered point cloud media to generate the final point cloud video for display on the display 318. User interaction information 320, such as a user's location in 3D space or the direction and viewpoint of the user, can be delivered to the modules involved in processing the point cloud media (e.g., the parser 306, the 2D video decoder(s) 310, and/or the video to point cloud converter 314) to dynamically change the portion of the data for adaptive rendering of content according to the user's interaction information 320.

Figure 4:
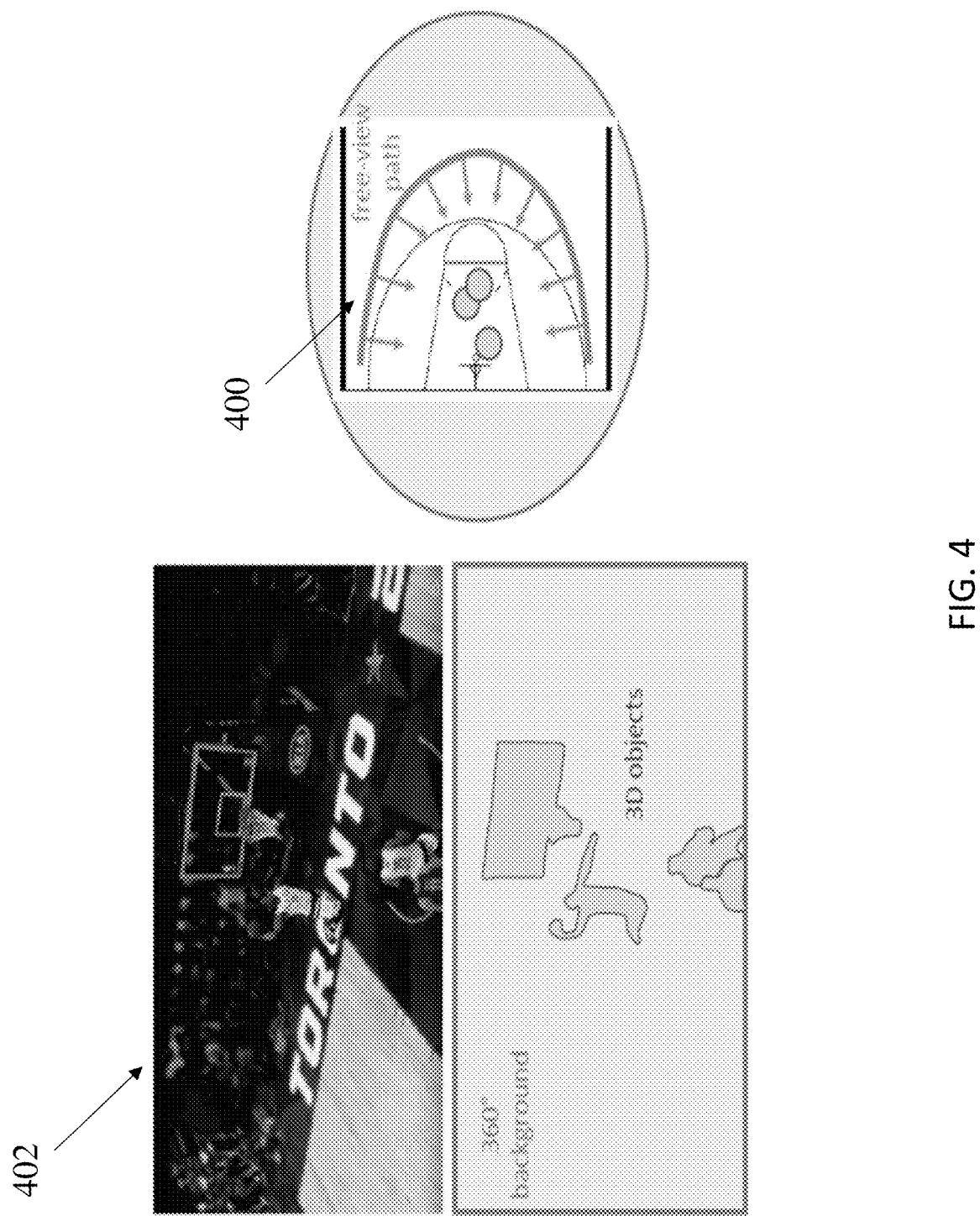
FIG. 4 shows an example of a free-view path, according to some examples.

User interaction information for point cloud media needs to be provided in order to achieve such user interaction-based rendering. In particular, the user interaction information 320 needs to be specified and signaled in order for the client 302 to communicate with the render module 316, including to provide information of user-selected viewports. Point cloud content can be presented to the user via editor cuts, or as recommended or guided views or viewports. FIG. 4 shows an example of a free-view path 400, according to some examples. The free-view path 400 allows the user to move about the path to view the scene 402 from different viewpoints.

Viewports, such as recommended viewports (e.g., Video-based Point Cloud Compression (V-PCC) viewports), can be signaled for point cloud content. A point cloud viewport, such as a PCC (e.g., V-PCC or G-PCC (Geometry based Point Cloud Compression)) viewport, can be a region of point cloud content suitable for display and viewing by a user. Depending on a user's viewing device(s), the viewport can be a 2D viewport or a 3D viewport. For example, a viewport can be a 3D spherical region or a 2D planar region in the 3D space, with six degrees of freedom (6 DoF). The techniques can leverage 6D spherical coordinates (e.g., '6dsc') and/or 6D Cartesian coordinates (e.g., '6dcc') to provide point cloud viewports. Viewport signaling techniques, including leveraging '6dsc' and '6dcc,' are described in co-owned U.S. patent application Ser. No. 16/738,387, titled "Methods and Apparatus for Signaling Viewports and Regions of Interest for Point Cloud Multimedia Data," which is hereby incorporated by reference herein in its entirety. The techniques can include the 6D spherical coordinates and/or 6D Cartesian coordinates as timed metadata, such as timed metadata in ISOBMFF. The techniques can use the 6D spherical coordinates and/or 6D Cartesian coordinates to specify 2D point cloud viewports and 3D point cloud viewports, including for V-PCC content stored in ISOBMFF files. The '6dsc' and '6dcc' can be natural extensions to the 2D Cartesian coordinates '2dcc' for planar regions in the 2D space, as provided for in MPEG-B part 10.

In V-PCC, the geometry and texture information of a video-based point cloud is converted to 2D projected frames and then compressed as a set of different video sequences. The video sequences can be of three types: one representing the occupancy map information, a second representing the geometry information and a third representing the texture information of the point cloud data. A geometry track may contain, for example, one or more geometric aspects of the point cloud data, such as shape information, size information, and/or position information of a point cloud. A texture track may contain, for example, one or more texture aspects of the point cloud data, such as color information (e.g., RGB (Red, Green, Blue) information), opacity information, reflectance information and/or albedo information of a point cloud. These tracks can be used for reconstructing the set of 3D points of the point cloud. Additional metadata needed to interpret the geometry and video sequences, such as auxiliary patch information, can also be generated and compressed separately. While examples provided herein are explained in the context of V-PCC, it should be appreciated that such examples are intended for illustrative purposes, and that the techniques described herein are not limited to V-PCC.

V-PCC has yet to finalize a track structure. An exemplary track structure under consideration in the working draft of V-PCC in ISOBMFF is described in N18059, "WD of Storage of V-PCC in ISOBMFF Files," October 2018, Macau, CN, which is hereby incorporated by reference herein in its entirety. The track structure can include a track that includes a set of patch streams, where each patch stream is essentially a different view for looking at the 3D content. As an illustrative example, if the 3D point cloud content is thought of as being contained within a 3D cube, then there can be six different patches, with each patch being a view of one side of the 3D cube from the outside of the cube. The track structure also includes a timed metadata track and a set of restricted video scheme tracks for geometry, attribute (e.g., texture), and occupancy map data. The timed metadata track contains V-PCC specified metadata (e.g., parameter sets, auxiliary information, and/or the like). The set of restricted video scheme tracks can include one or more restricted video scheme tracks that contain video-coded elementary streams for geometry data, one or more restricted video scheme tracks that contain video coded elementary streams for texture data, and a restricted video scheme track containing a video-coded elementary stream for occupancy map data. The V-PCC track structure can allow changing and/or selecting different geometry and texture data, together with the timed metadata and the occupancy map data, for variations of viewport content. It can be desirable to include multiple geometry and/or texture tracks for a variety of scenarios. For example, the point cloud may be encoded in both a full quality and one or more reduced qualities, such as for the purpose of adaptive streaming. In such examples, the encoding may result in multiple geometry/texture tracks to capture different samplings of the collection of 3D points of the point cloud. Geometry/texture tracks corresponding to finer samplings can have better qualities than those corresponding to coarser samplings.

During a session of streaming the point cloud content, the client can choose to retrieve content among the multiple geometry/texture tracks, in either a static or dynamic manner (e.g., according to client's display device and/or network bandwidth).

A point cloud tile can represent 3D and/or 2D aspects of point cloud data. For example, as described in N18188, entitled "Description of PCC Core Experiment 2.19 on V-PCC tiles, Marrakech, MA (January 2019), V-PCC tiles can be used for Video-based PCC. An example of Video-based PCC is described in N18180, entitled "ISO/IEC 23090-5: Study of CD of Video-based Point Cloud Compression (V-PCC)," Marrakech, MA (January 2019). Both N18188 and N18180 are hereby incorporated by reference herein in their entirety. A point cloud tile can include bounding regions or boxes to represent the content or portions thereof, including bounding boxes for the 3D content and/or bounding boxes for the 2D content. In some examples, a point cloud tile includes a 3D bounding box, an associated 2D bounding box, and one or more independent coding unit(s) (ICUs) in the 2D bounding box. A 3D bounding box can be, for example, a minimum enclosing box for a given point set in three dimensions. A 3D bounding box can have various 3D shapes, such as the shape of a rectangular parallelpiped that can be represented by two 3-tuples (e.g., the origin and the length of each edge in three dimensions). A 2D bounding box can be, for example, a minimum enclosing box (e.g., in a given video frame) corresponding to the 3D bounding box (e.g., in 3D space). A 2D bounding box can have various 2D shapes, such as the shape of a rectangle that can be represented by two 2-tuples (e.g., the origin and the length of each edge in two dimensions). There can be one or more ICUs (e.g., video tiles) in a 2D bounding box of a video frame. The independent coding units can be encoded and/or decoded without the dependency of neighboring coding units.

Figure 5:
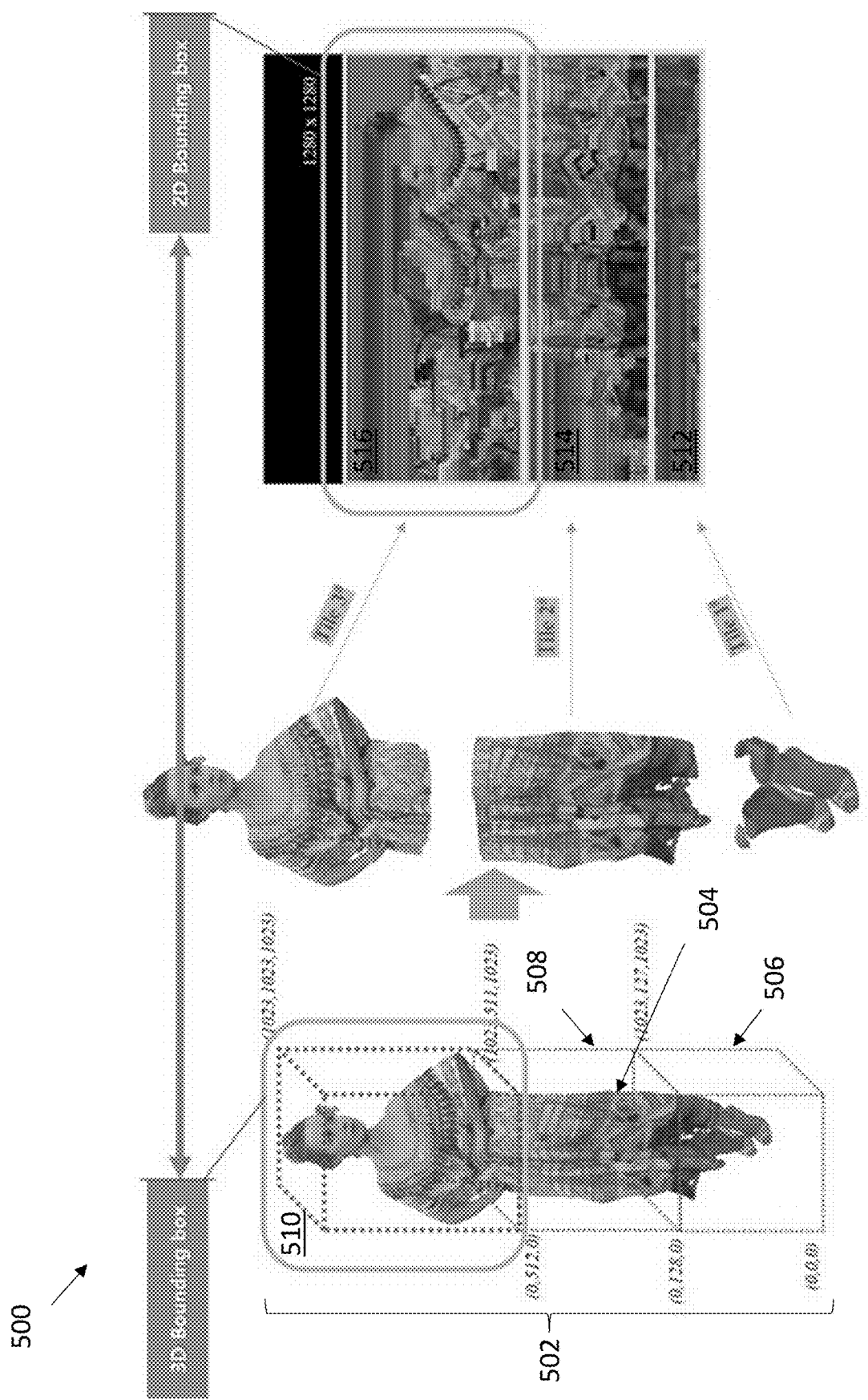
FIG. 5 is a diagram showing exemplary point cloud tiles, including 3D and 2D bounding boxes, according to some examples.

FIG. 5 is a diagram showing exemplary point cloud tiles, including 3D and 2D bounding boxes, according to some examples. Point cloud content typically only includes a single 3D bounding box around the 3D content, shown in FIG. 5 as the large box 502 surrounding the 3D point cloud content 504. As described above, a point cloud tile can include a 3D bounding box, an associated 2D bounding box, and one or more independent coding unit(s) (ICUs) in the 2D bounding box. To support viewport dependent processing, the 3D point cloud content typically needs to be subdivided into smaller pieces or tiles. FIG. 5 shows, for example, the 3D bounding box 502 can be divided into smaller 3D bounding boxes 506, 508 and 510, which each have an associated 2D bounding box 512, 514 and 516, respectively.

As described herein, some embodiments of the techniques can include, for example, sub-dividing the tiles (e.g., sub-dividing 3D/2D bounding boxes) into smaller units to form desired ICUs for V-PCC content. The techniques can encapsulate the sub-divided 3D volumetric regions and 2D pictures into tracks, such as into ISOBMFF visual (e.g., sub-volumetric and sub-picture) tracks. For example, the content of each bounding box can be stored into an associated sets of tracks, where each of the sets of tracks stores the content of one of the sub-divided 3D sub-volumetric regions and/or 2D sub-pictures. For the 3D sub-volumetric case, such a set of tracks include tracks that store geometry, attribute and texture attributes. For the 2D sub-picture case, such a set of tracks may just contain a single track that stores the sub-picture content. The techniques can provide for signaling relationships among the sets of tracks, such as signaling the respective 3D/2D spatial relationships of the sets of tracks using track groups and/or sample groups of '3dcc' and '2dcc' types. The techniques can signal the tracks associated with a particular bounding box, a particular sub-volumetric region or a particular sub-picture, and/or can signal relationships among the sets of tracks of different bounding boxes, sub-volumetric regions and sub-pictures. Providing point cloud content in separate tracks can facilitate advanced media processing not otherwise available for point cloud content, such as point cloud tiling (e.g., V-PCC tiling) and viewport-dependent media processing.

In some embodiments, the techniques provide for dividing the point cloud bounding boxes into sub-units. For example, the 3D and 2D bounding boxes can be sub-divided into 3D sub-volumetric boxes and 2D sub-picture regions, respectively. The sub-regions can provide ICUs that are sufficient for track-based rendering techniques. For example, the sub-regions can provide ICUs that are fine enough from a systems point of view for delivery and rendering in order to support the viewport dependent media processing. In some embodiments, the techniques can support viewport dependent media processing for V-PCC media content, e.g., as provided in m46208, entitled "Timed Metadata for (Recommended) Viewports of V-PCC Content in ISOBMFF," Marrakech, MA (January 2019), which his hereby incorporated by reference herein in its entirety. As described further herein, each of the sub-divided 3D sub-volumetric boxes and 2D sub-picture regions can be stored in tracks in a similar manner as if they are (e.g., un-sub-divided) 3D boxes and 2D pictures, respectively, but with smaller sizes in terms of their dimensions. For example, in the 3D case, a sub-divided 3D sub-volumetric box/region will be stored in a set of tracks comprising geometry, texture and attribute tracks. As another example, in the 2D case, a sub-divided sub-picture region will be stored in a single (sub-picture) track. As a result of sub-dividing the content into smaller sub-volumes and sub-pictures, the ICUs can be carried in various ways. For example, in some embodiments different sets of tracks can be used to carry different sub-volumes or sub-pictures, such that the tracks carrying the sub-divided content have less data compared to when storing all of the un-sub-divided content. As another example, in some embodiments some and/or all of the data (e.g., even when subdivided) can be stored in the same tracks, but with smaller units for the sub-divided data and/or ICUs (e.g., so that the ICUs can be individually accessed in the overall set of track(s)).

Figure 6:
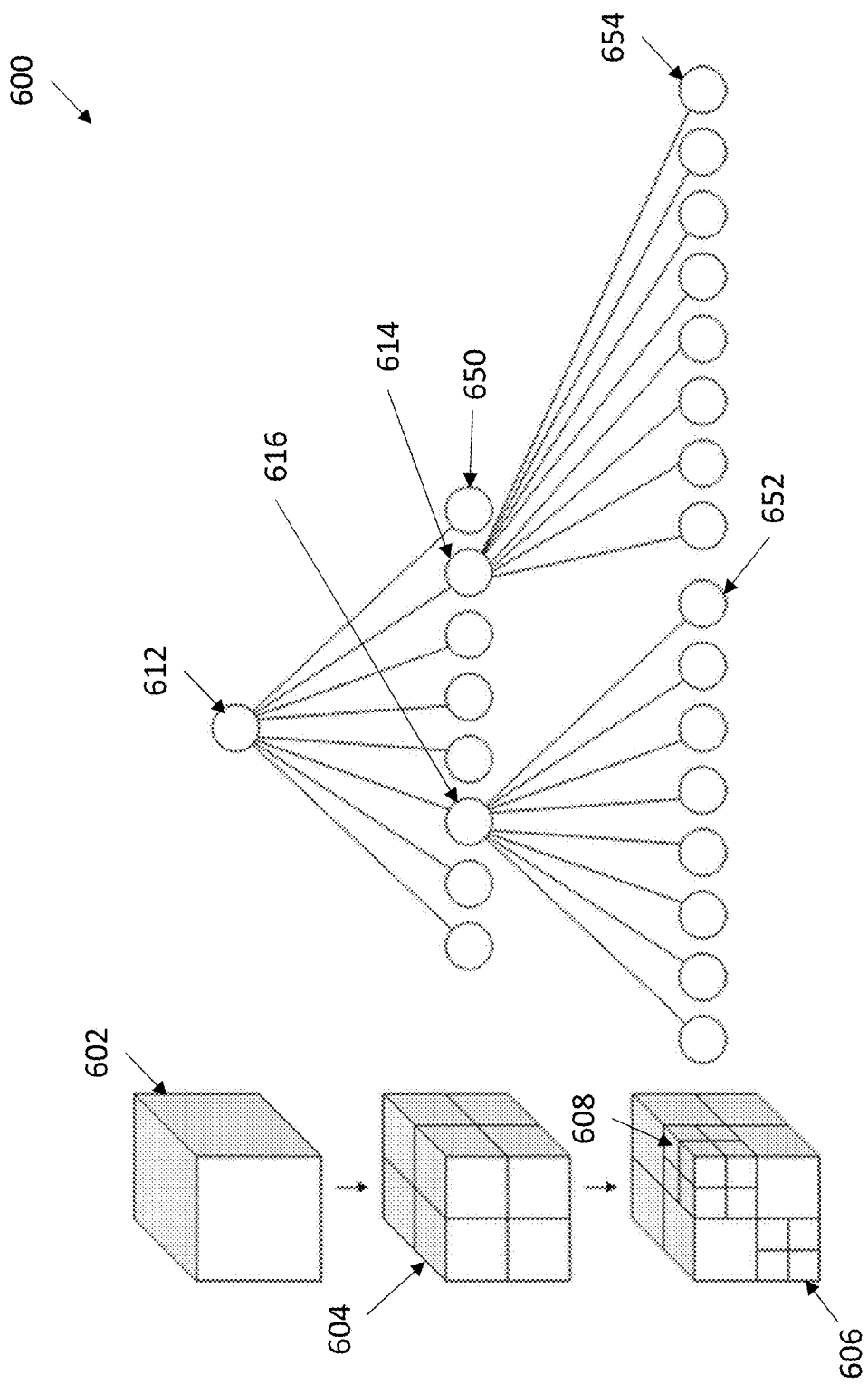
FIG. 6 is a diagram showing an exemplary octree-based division for 3D sub-volumetric decomposition, according to some embodiments.

Various types of division can be used to provide the sub-units or ICUs, including 3D and 2D divisions. FIG. 6 is a diagram 600 showing an exemplary octree-based division for 3D sub-volumetric decomposition, according to some embodiments. As shown on the left, a 3D bounding box 602 can be divided into eight sub-regions 604, which can be further sub-divided as shown for sub-regions 606 and 608. In some embodiments, the system can determine how to divide and further sub-divided the point cloud content based on various parameters, such as the ROIs associated with the point cloud content, an amount of detail that is supported for a particular side, and/or the like. Referring to the tree structure, each interior node (e.g., nodes 612, 614 and 616) in the tree represents a 3D source, which is divided into a plurality of regions such that each sub-node represents the sub-volumetric tracks. As described further herein, a track group (e.g., a '3dcc' track group) can be used to represent the sub-volumetric tracks.

Figure 7:
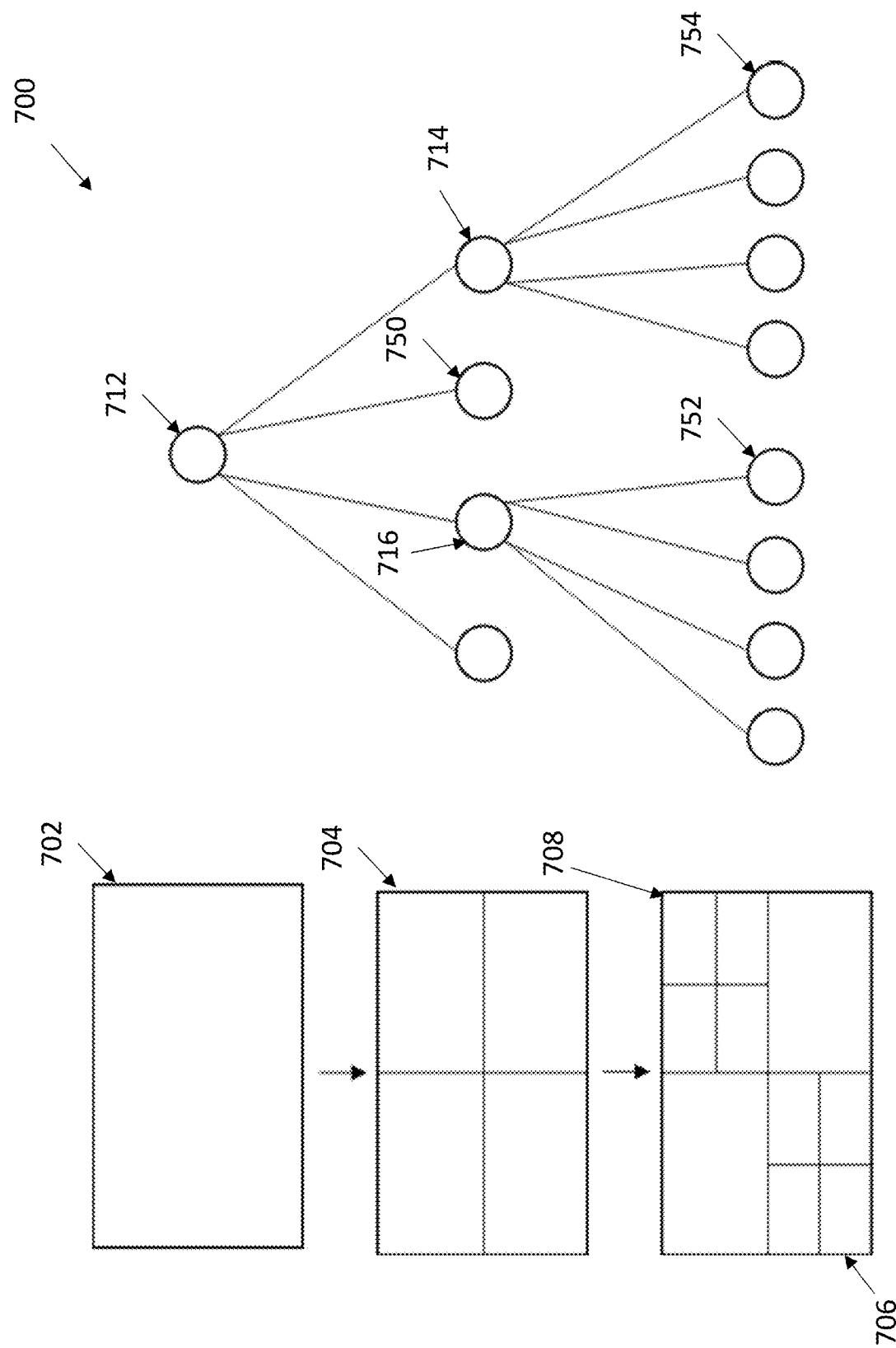
FIG. 7 is a diagram showing an exemplary quadtree-based division for 2D sub-picture decomposition, according to some embodiments.

FIG. 7 is a diagram 700 showing an exemplary quadtree-based division for 2D sub-picture decomposition, according to some embodiments. As shown on the left, a 2D bounding box 702 can be divided into four sub-regions 704, which can be further sub-divided as shown for sub-regions 706 and 708. Each interior node (e.g., nodes 712, 714 and 716) in the tree represents a 2D source, which is divided into a plurality of regions such that each sub-node represents the sub-picture tracks. As described further herein, a track group (e.g., a '2dcc' track group) can be used to represent the sub-picture tracks.

The subdivided 2D and 3D regions may be of various shapes, such as squares, cubes, rectangles, and/or arbitrary shapes. The division along each dimension may not be binary. Therefore, each division tree of an outer-most 2D/3D bounding box can be much more general than the quadtree and octree examples provided herein. It should therefore be appreciated that various shapes and subdivision strategies can be used to determine each leaf region in the division tree, which represents an ICU (in the 2D or 3D space or bounding box). As described herein, the ICUs can be configured such that for end-to-end media systems the ICUs support viewport dependent processing (including delivery and rendering). For example, the ICUs can be configured according to m46208, where a minimal number of ICUs can be spatially randomly accessible for covering a viewport that is potentially dynamically moving (e.g., for instance, controlled by the user on a viewing device or based on a recommendation from the editor).

The point cloud ICUs can be carried in associated, separate tracks. In some embodiments, the ICUs and division trees can be carried and/or encapsulated in respective sub-volumetric and sub-picture tracks and track groups. The spatial relationship and sample groups of the sub-volumetric and sub-picture tracks and track groups can be signaled in, for example, ISOBMFF as described in IS O/IEC 14496-12.

Some embodiments can leverage, for the 2D case, the generic sub-picture track grouping extensions with the track grouping type '2dcc' as provided in OMAF, e.g., as provided in Section 7.1.11 of the working draft of OMAF, 2nd Edition, N18227, entitled "WD 4 of ISO/IEC 23090-2 OMAF 2nd edition," Marrakech, MA (January 2019), which is hereby incorporated by reference herein in its entirety. Some embodiments can update and extend, for the 3D case, the generic sub-volumetric track grouping extension with a new track grouping type '3dcc'. Such 3D and 2D track grouping mechanisms, can be used to group the example (leaf node) sub-volumetric tracks in the octree decomposition and sub-picture tracks in the quadtree decomposition into three '3dcc' and '2dcc' track groups, respectively.

Figure 8:
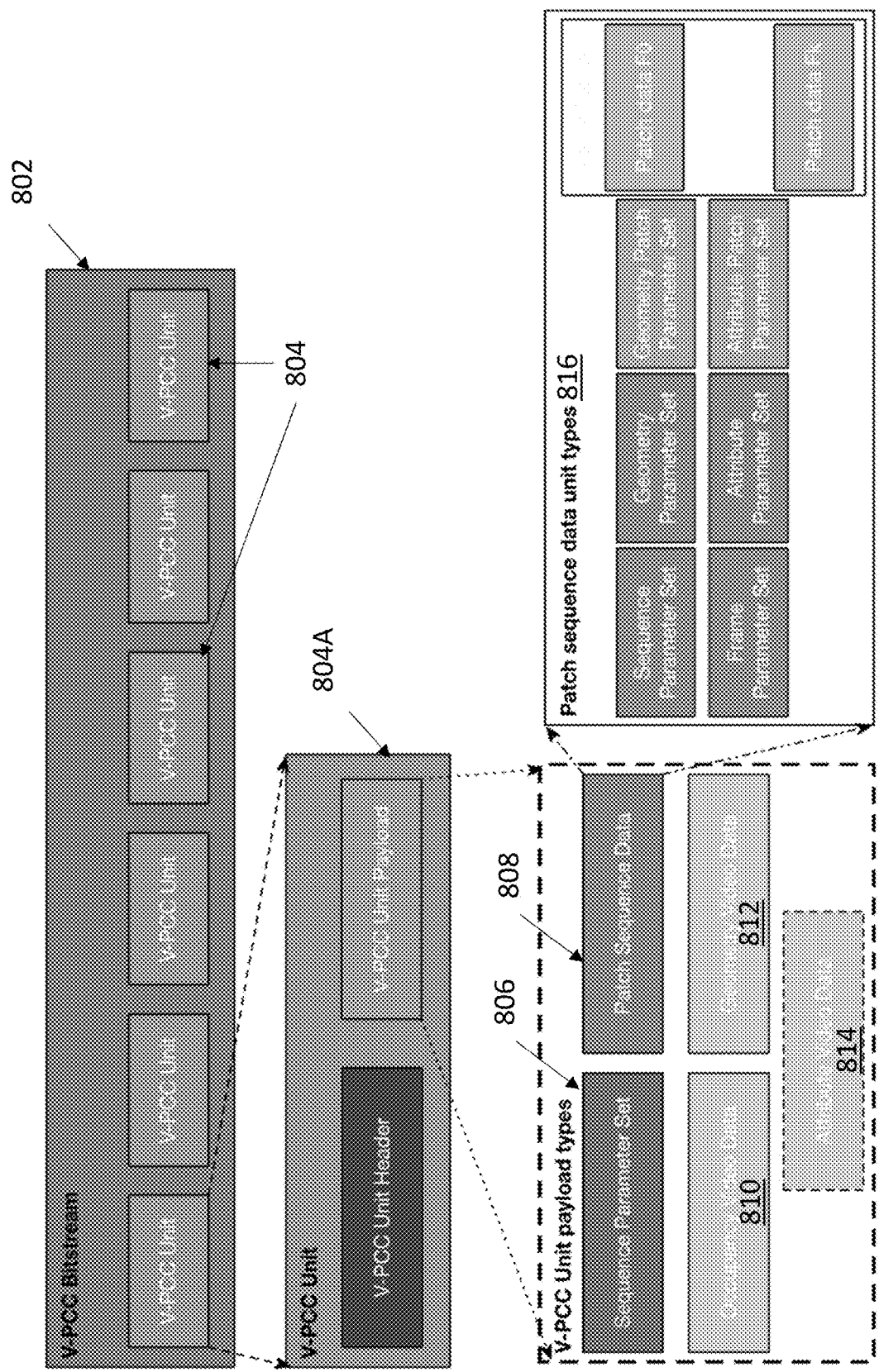
FIG. 8 shows a V-PCC bitstream that is composed of a set of V-PCC units, according to some examples.

A point cloud bit stream can include a set of units that carry the point cloud content. The units can allow, for example, random access to the point cloud content (e.g., for ad insertion and/or other time-based media processing). For example, V-PCC can include a set of V-PCC Units, as described in N18180, "ISO/IEC 23090-5: Study of CD of Video-based Point Cloud Compression (V-PCC)," Marrakech, MA. January 2019, which is hereby incorporated by reference herein in its entirety. FIG. 8 shows a V-PCC bitstream 802 that is composed of a set of V-PCC units 804, according to some examples. Each V-PCC unit 804 has a V-PCC unit header and a V-PCC unit payload, as shown for V-PCC unit 804A, which includes V-PCC unit header and a V-PCC unit payload. The V-PCC unit header describes the V-PCC unit type. The V-PCC unit payload can include a sequence parameter set 806, patch sequence data 808, occupancy video data 810, geometry video data 812, and attribute video data 814. The patch sequence data unit 808 can include one or more patch sequence data unit types 816 as shown (e.g., sequence parameter set, frame parameter set, geometry parameter set, attribute parameter set, geometry patch parameter set, attribute patch parameter set, and/or patch data, in this non-limiting example).

In some examples, the occupancy, geometry, and attribute Video Data unit payloads 810, 812 and 814, respectively, correspond to video data units that could be decoded by the video decoder specified in the corresponding occupancy, geometry, and attribute parameter set V-PCC units. Referring to the patch sequence data unit types, V-PCC considers an entire 3D bounding box (e.g., 502 in FIG. 5) to be a cube, and considers projection onto one surface of the cube to be a patch (e.g., such that there can be six patches for each side). Therefore, the patch information can be used to indicate how the patches are encoded and relate to each other.

Figure 9:
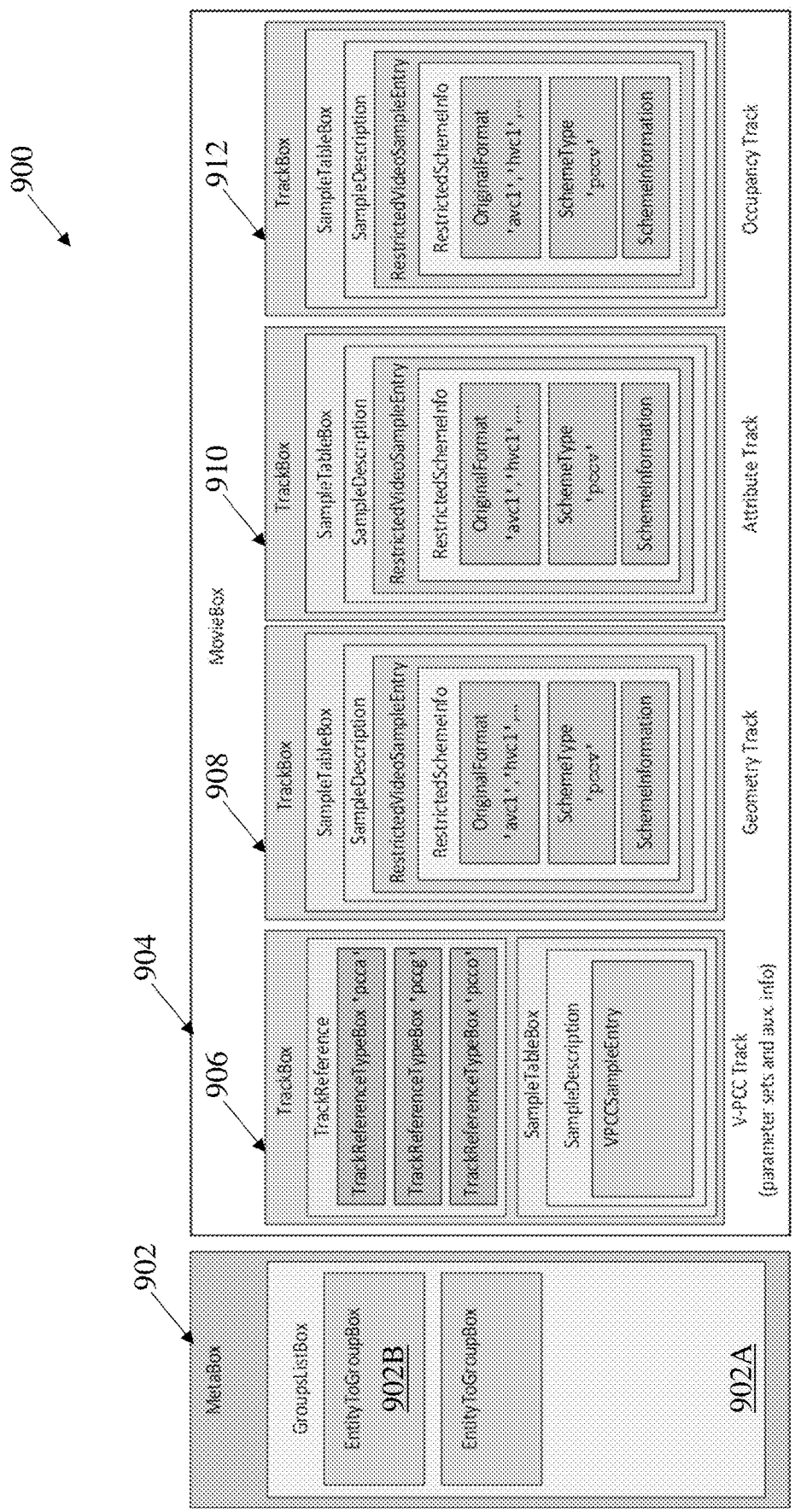
FIG. 9 shows an ISOBMFF-based V-PCC container, according to some examples.

The inventors have appreciated various deficiencies with conventional point cloud content containers and track structures. It can be desirable to have V-PCC tiles for Video-based PCC (e.g., as described in N18180 or S. Schwarz, etc. "Emerging MPEG Standards for Point Cloud Compression". IEEE Journal on Emerging and Selected Topics in Circuits and Systems, Vol. 9, No. 1, March 2019, which is hereby incorporated by reference in its entirety) to support various processing capabilities, such as to support one or more of parallel encoding and decoding, spatial random access, and ROI-based patch packing. However, when partitioning the point cloud content (e.g., as discussed in conjunction with FIGS. 6-7, such that V-PCC media content can be tiled), the inventors have appreciated that existing point cloud content structures are inadequate to carry partitioned point cloud content. For example, FIG. 9 shows an ISOBMFF-based V-PCC container 900, according to some examples. The container 900 can be, for example, as documented in the latest WD of Carriage of Point Cloud Data N18266m "WD of ISO/IEC 23090-10 Carriage of PC data," Marrakech, MA. January 2019, which is hereby incorporated by reference herein in its entirety. As shown, the V-PCC container 900 includes a metadata box 902 and a movie box 904 that includes a V-PCC parameter track 906, a geometry track 908, an attribute track 910, and an occupancy track 912. Therefore, the movie box 904 includes the general tracks (e.g., geometry, attribute, and occupancy tracks), and a separate metadata box track 902 includes the parameters and grouping information.

The inventors have appreciated various deficiencies with using conventional point cloud container techniques. For example, referring to FIG. 9, the container 900 is inadequate to store partitioned point cloud content, including due to the separate metadata box 902. For example, each of the leaf nodes for the sub-divided 2D sub-pictures or 3D sub-regions needs to be carried as a valid elementary V-PCC media track, and each of the non-leaf nodes need to be carried as a valid composite V-PCC media track as well, which cannot be supported by conventional V-PCC containers (e.g., as shown in FIG. 9). In particular, such conventional storage structures only provide a collection of V-PCC component data tracks and do not provide a single visual media track that can represent the renderable V-PCC media content. As an illustrative example, each EntityToGroupBox 902B in the GroupListBox 902A of the Metabox 902 contains a list of references to entities, which in this example include a list of references to the V-PCC parameter track 906, the geometry track 908, the attribute track 910, and the occupancy track 912. A device uses those referenced tracks to collectively re-construct a version of the underlying point cloud content (e.g., with a certain quality). There is no existing mechanism in ISOBMFF to associate metadata (e.g., metadata carried in a timed metadata track) with the MetaBox 902, including with the EntityToGroupBox 902B or GroupListBox 902A. Additionally, or alternatively, it is desirable to support dynamic adaptation cases, which includes switching from a referenced track to its counterpart track in another list. However, the structure of container 900 requires a device to, in order to switch from a list of referenced tracks to another list, parse through all of the EntityToGroupBox's in the GroupListBox, which is time consuming and inefficient, and is therefore not a preferable solution.

The techniques described herein provide for point cloud content track structures and track derivation techniques (e.g., including advances to the proposal m46207, "Track Derivation for Storage of V-PCC Content in ISOBMFF," Marrakech, MA January 2019, which is hereby incorporated by reference herein in its entirety), for overcoming such point cloud container deficiencies. In some embodiments, as described further herein, the techniques provide for point cloud content containers that provide visual media tracks that can represent the point cloud content (e.g., V-PCC media content). In some embodiments, as also described further herein, the techniques provide track derivation techniques for constructing composite point cloud tracks (e.g., V-PCC media tracks) from their sub-divided tracks (e.g., subdivided 2D sub-picture and 3D sub-region V-PCC tracks). According to some aspects, the track derivation techniques can be used to encapsulate not only V-PCC visual media content (e.g., elementary V-PCC visual media content) but also sub-divided 2D/3D V-PCC tiled visual media content (e.g., composite sub-divided 2D/3D V-PCC tiled visual media content) in ISOBMFF. In some examples, the techniques can meet some or all of the requirements in the PCC CE 2.19 (N18188, "Description of PCC Core Experiment 2.19 on V-PCC tiles," Marrakech, MA. January 2019, which is incorporated by reference herein in its entirety) for tiling V-PCC media content, some or all of the requirements in m46208, "Timed Metadata for (Recommended) Viewports of V-PCC Content in ISOBMFF," Marrakech, Mass., January 2019 for the V-PCC viewpoint dependent media processing, which is hereby incorporated by reference herein in its entirety, and/or the like.

Figure 10:
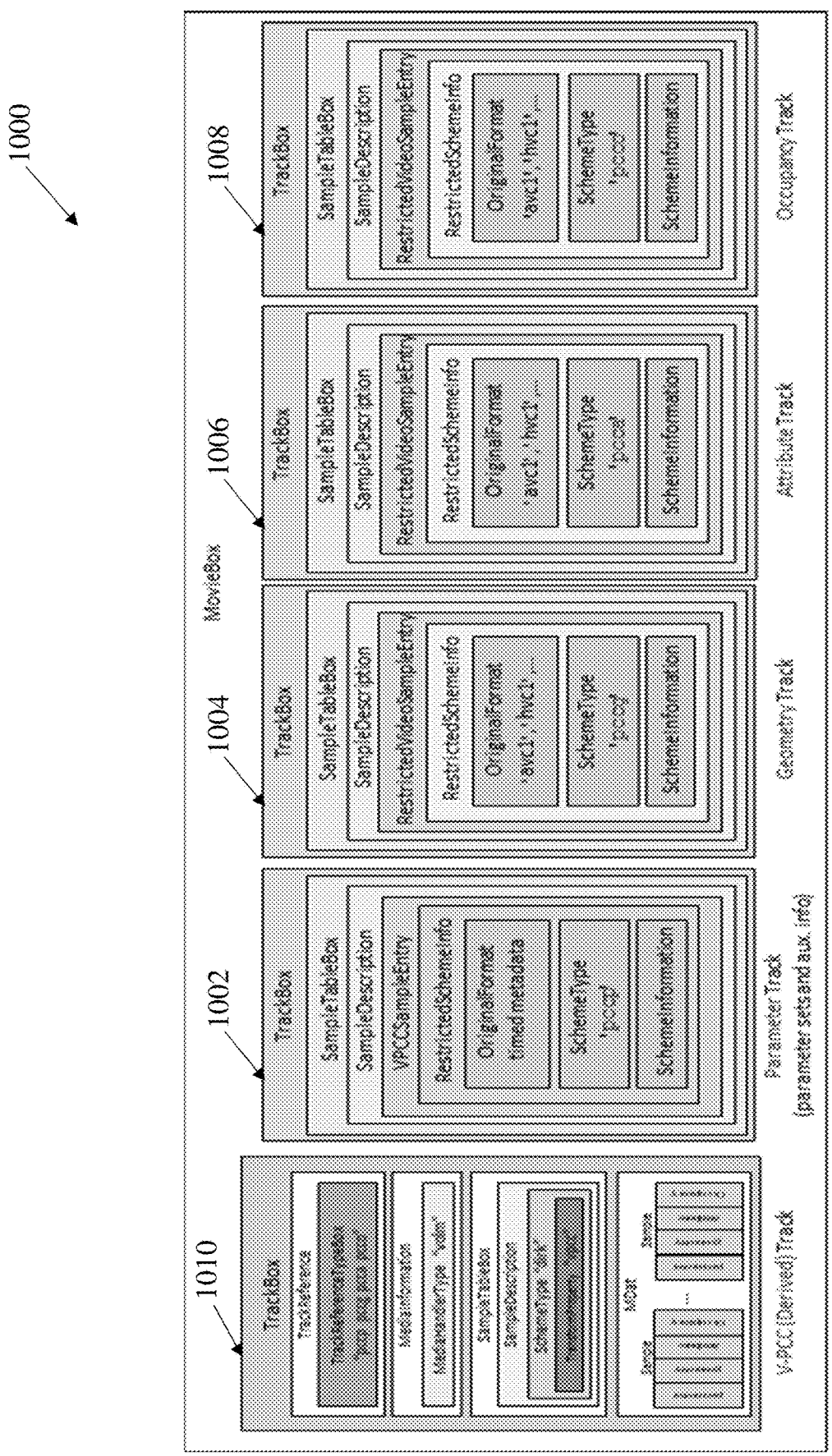
FIG. 10 shows an example of a point cloud structure designed to support track derivations, according to some embodiments.

In some embodiments, the techniques provide for using derived tracks to carry point cloud content. Various point cloud tracks, such as parameter tracks, geometry tracks, attribute tracks, and/or occupancy tracks can provide the point cloud content information. The point cloud content can be recovered by performing one or more derivation operations. For example, referring to FIG. 3, the video to point cloud content converter 314 can perform track derivation operations to convert the track content into point cloud data. Therefore, the parameter track, geometry track, attribute track, and/or occupancy track can be the input tracks for the derived track. FIG. 10 shows an example of a point cloud structure 1000 designed to support track derivations, according to some embodiments. The point cloud structure 1000 will be discussed in the context of V-PCC, but it should be appreciated that this is not intended to be limiting as the techniques can be applied to any type of point cloud content. As shown in the exemplary structure 1000, the V-PCC component data units are stored in their respective tracks, including one or more geometry tracks 1004, one or more attribute tracks 1006, and an occupancy track 1008 (e.g., as specified in the WD N18266). Unlike existing techniques, the parameter (e.g., metadata) track 1002 need not make reference to the geometry track 1004, attribute track 1006, and/or occupancy track 1008.

In some embodiments, the parameter track 1002 contains V-PCC provided timed metadata (e.g., including parameter sets, auxiliary information, and/or the like). In some examples, the parameter track 1002 does not need to reference other component tracks (e.g., if the timing information of the metadata track is used for synchronizing with the other component tracks). The one or more geometry video tracks 1004 contain video-coded elementary streams for geometry data. In some embodiments, when there are a plurality of geometry tracks, the geometry tracks can be grouped together as an alternate track group (e.g., with a same id value for alternate_group in the track header), represented using a "selection of one" derived track ('sell') (e.g., as described in m44800, "Media Processing related Track Derivations in ISOBMFF," October 2018, Macau, Conn., which is hereby incorporated by reference herein in its entirety), and/or the like. The one or more attribute video tracks 1006 contains video coded elementary streams for attribute data. In some embodiments, like with the geometry tracks, when there are a plurality of geometry tracks, the geometry tracks can be grouped together as an alternate track group, represented using a "selection of one" derived track, and/or the like. The occupancy map video track contains a video-coded elementary stream for the occupancy map data.

In some embodiments, the point cloud content is a single derived track. For example, a V-PCC media track can be a single derived track with a media (handler) type for volumetric content (e.g., 'volm'), serving as the entry point for the V-PCC content. As described herein, the input tracks for track derivation are the component tracks, including the parameter track, geometry video track, attribute video track, and/or occupancy video track. In some embodiments, a sample of the V-PCC media track to be derived is a collection of the samples from the input component tracks with the same timing information. In some embodiments, a timed metadata track about the V-PCC content can make reference to the V-PCC media track. The timed metadata track can reference the V-PCC media track using, for example, track reference types in ISOBMFF (e.g., 'hint', 'cdsc' and/or the like described in 14496-12), rather than grouping all related V-PCC content tracks (e.g., signaled in the V-PCC-defined EntityToGroupBox).

Figure 11:
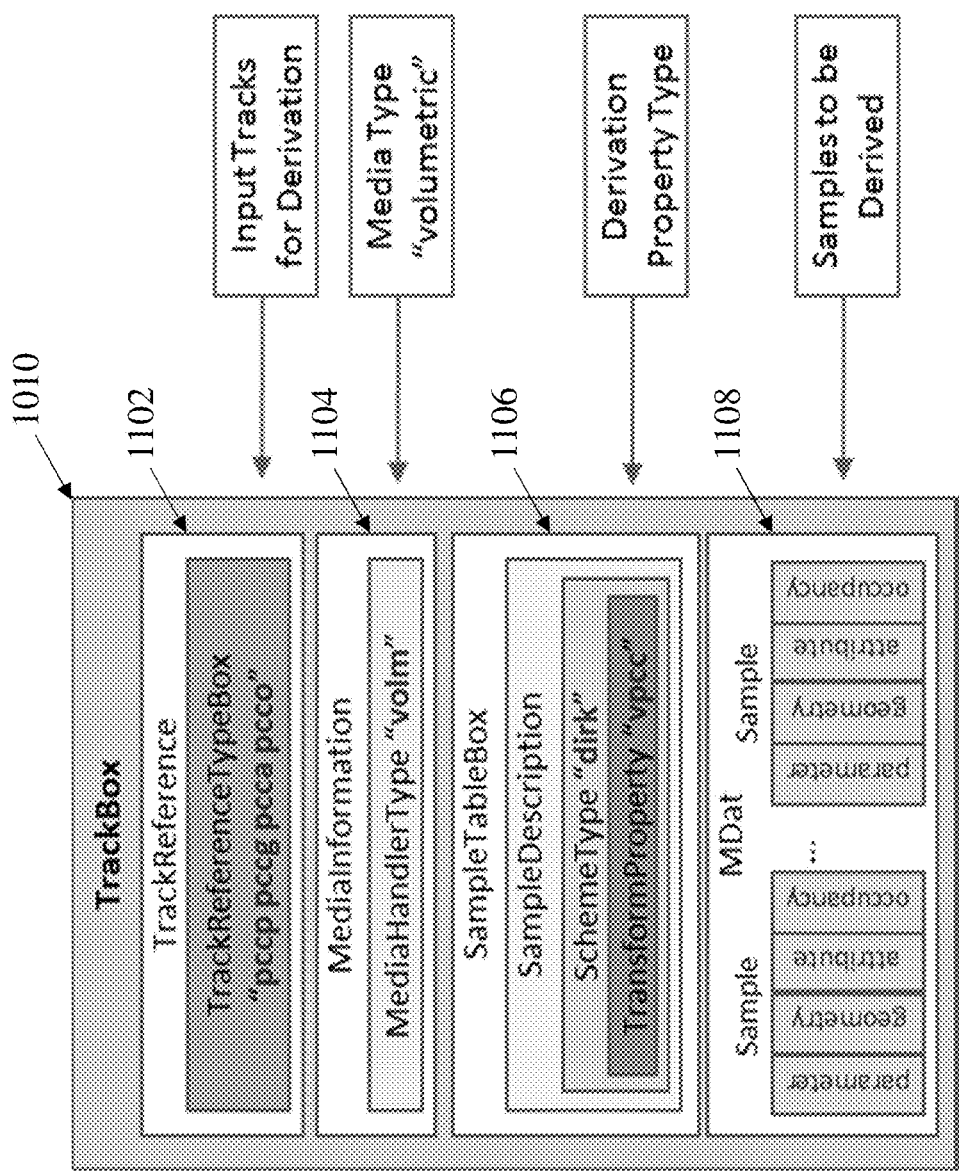
FIG. 11 shows the track box from FIG. 10, according to some embodiments.

As shown in FIG. 11, the track box 1010 from FIG. 10 includes a track reference box 1102 for the input tracks for derivation. The track box 1010 includes a media information box 1104 that specifies the media type (e.g., "volumetric"). The track box 1010 includes a sample table box 1106 that specifies the derivation property type. The track box 1010 also includes a mdat box 1108 that specifies the samples to be derived (e.g., including parameter, geometry, attribute, and occupancy).

Therefore, the techniques can provide for making the separate point cloud tracks in the movie box as input tracks to the (derived) track box, and for specifying information on how to combine the content of those tracks into the point cloud track. As described herein, the derived track represents the point cloud track converted from those tracks. The techniques further provide for associating metadata with the point cloud track (e.g., by associating the metadata with the derived track). For example, the metadata can include information on one or more ROIs, and the metadata specifying the ROI can be associated with the derived track. Otherwise, as explained above, without such techniques, conventional point cloud containers do not provide a single track that represents the point cloud content. Without having a single track to represent the point cloud content (e.g., the derived track), information about the point cloud content, such as ROIs and/or other metadata, could not be specified for the point cloud content carried in a collection of tracks (e.g., without creating new mechanisms and modifying existing mechanisms in ISOBMFF, such as associating a timed metadata track with a track).

In some embodiments, the derived track can be specified by using one or more boxes. For example, the derived track can be specified according to the track derivation mechanisms in the ISOBMFF TuC N18240, "Technologies under Consideration for ISOBMFF," Marrakech, Mass., January 2019, which is hereby incorporated by reference herein in its entirety. In some embodiments, the track derivation can be specified using a box type 'vpcc.' The box type 'vpcc' is not mandatory per sample, and any quantity can be used per sample. In some embodiments, the V-PCC content 'vpcc' transform property, when present, can include a number of inputs (e.g., num_inputs) that is equal to four (4). In some embodiments, the input entities for the corresponding derivation operation are four (4) V-PCC component tracks, one for each track type: 'pccp'(parameter), 'pccg'(geometry), 'pcca'(attribute) and 'pcco' (occupancy map). The 'vpcc' transform property can specify a sample of the derived track as a list of the samples from the input component tracks associated with the same timestamp (e.g., the same single timestamp). In some embodiments, the sample of the derived track can be specified in the order of 'pccp', 'pccg', 'pcca' and 'pcco' (e.g., as shown in FIGS. 10-11 for the track reference type box 1102 of the track box 1010. In some embodiments, a syntax can be provided for the point cloud transform property. For example, the syntax can be an aligned(8) class V-PCCContent that extends the TransformProperty ('vpcc').

In some embodiments, the transform property (e.g., the 'vpcc' transform property) can be configured for circumstances where there are a plurality of component tracks of the same type (e.g., there are a plurality of texture tracks). For example, the "selection of one" derived tracks can be used to first select one track from a group of component tracks of a same type, and the resulted "selection of one" tracks can be used as part of the 4 input tracks.

In some embodiments, when point cloud media content is divided into tiles (e.g., sub-divided 3D sub-regions and 2D sub-pictures as ICUs, as proposed in m47335, "Signaling of 2D and 3D Spatial Relationship and Sample groups for V-PCC Visual (Sub-Picture and Sub-Volumetric) Tracks in ISOBMFF," Geneva, CH, March 2019, which is hereby incorporated by reference herein in its entirety, and illustrated in FIGS. 6-7), the leaf nodes in the 3D and 2D sub-division trees can be considered as (e.g., composite) point cloud media content. In some embodiments, the corresponding tiled media content of the leaf nodes can be encapsulated in their respective V-PCC media tracks, e.g., as proposed derived tracks from their component tracks as described in conjunction with FIGS. 10-11. In some embodiments, the internal (non-leaf) nodes can be also as (but composite) V-PCC media content and hence their corresponding tiled media content also encapsulated in their respective V-PCC media tracks. This is illustrated in FIGS. 6-7. Referring to FIG. 6, for example, the interior nodes 612, 614 and 616 are non-leaf composite tracks (e.g., V-PCC tracks), and the leaf tracks, including 650, 652 and 654 as examples, are leaf V-PCC tracks. Referring to FIG. 7, as another example, the interior nodes 712, 714 and 716 are non-leaf composite tracks (e.g., V-PCC tracks), and the leaf tracks, including 750, 752 and 754 as examples, are leaf V-PCC tracks.

In some embodiments, while the V-PCC media content in each of the leaf (elementary) nodes can be encapsulated and carried in a V-PCC (derived) media track as discussed herein, non-leaf (e.g., composite) V-PCC tracks can be carried and encapsulated as tracks derived from their child node V-PCC tracks. In some embodiments, the techniques provide for specifying the derived tracks from rectangular sub-division tree nodes that are already encapsulated in their respective V-PCC sub-region or sub-picture tracks.

The derived tracks can be signaled in various ways. In some embodiments, the derived (e.g., composite) tracks can be signaled based on where the 2D/3D spatial relationship information of the input child tracks is carried. In some embodiments, the information can be carried in the derived (e.g., composite) tracks themselves. In some embodiments, the information can be carried in a track grouping box. For example, the information can be carried in the track grouping boxes SpatialRelationship2DDescriptionBox of type '2dcc' and SpatialRelationship3DDescriptionBox of type '3dcc,' as proposed in m47335.

In some embodiments, carrying the information in the derived track and/or in a track grouping box can be performed to achieve techniques similar to deriving sub-picture composition tracks, such as those described in Section 2.13 for track grid composition of the ISOBMFF TuC N18240, Section 2.15 for track grid sub-picture composition, and/or the like. As an example for V-PCC derived tracks, if the 2D/3D spatial relationship information is carried in the derived tracks, the tracking grouping case can be specified following Section 2.15 of the TuC. For example, the derived (composite) 2D V-PCC media tracks can be specified using a box type '2dpc,' which is not mandatory per sample and any quantity can be included per sample. The V-PCC content '2dpc' transform property, when present, can require that the number of input entries (e.g., num_input) is greater or equal to one (1), and the input entities are 2D V-PCC visual media tracks (e.g., as explained in conjunction with FIGS. 10-11). The '2dpc' transform property can specify a derived 2D V-PCC visual media track, where each of the component samples ('pccp', 'pccg', 'pcca' and 'pcco') is a composition of corresponding component samples of the input tracks in a given 2D grid order.

In some embodiments, the component samples of the input visual tracks can be composed respectively, in row-major order, top-row first, left to right, in the order they are listed as the input tracks. In some examples, the value of num_input can be equal to rows*columns. In some embodiments, the component samples can be associated, where appropriate, with the same width and height (e.g., width and height fields). The input component samples, when composed together, can partially and/or fully cover the derived component sample according to the grid, where width*columns is equal to output_width and height*rows is equal to output_height. Put another way, the derived component sample can be formed by tiling the input component samples into a 2D grid with a column width equal to the width value and a row height equal to the height value, without any gap or overlap.

FIG. 12 is an exemplary syntax for a 2D point cloud composition, according to some embodiments. In this example, the syntax specifies a V-PCC 2D grid composition class V-PCC2DGridComposition 1200 that extends TransformProperty ('2dpc'). It should be appreciated that while the exemplary syntaxes described herein include exemplary fields and field names (e.g., PCC2DGridComposition, version, flags, etc. in the example of FIG. 12), these names are for exemplary purposes and are not intended to be limiting.

It should be appreciated that other fields and/or naming conventions can be used without departing from the spirit of the techniques described herein.

The version 1202 can be set equal to 0 or another number, such that readers can be configured to not process this track derivation with an unrecognized version number. The flag field 1204 can be used to specify the FieldLength field 1206. For example, (flags & 1) equal to 0 can specify that the length of the fields output_width 1208 and output_height 1210 is 16 bits, while (flags & 1) equal to 1 specifies that the length of the fields output_width 1208 and output_height 1210 is 32 bits. In some embodiments, the values of the flags can be reserved, such as reserving the values of flags greater than 1.

The output_width 1208 and output_height 1210 fields specify the width and height, respectively, of the reconstructed component sample on which the input component samples are placed. The rows_minus_one 1212 and columns_minus_one 1214 specify the number of rows of component samples of the input visual tracks, and the number of component samples of the input visual tracks per row, such that the value is one less than the number of rows or columns respectively. Component samples of the input visual tracks can populate the top row first, followed by the second row, and so on, in the listing order of the input visual tracks.

Some embodiments provide for derived (e.g., composite) 3D V-PCC media tracks. The derived 3D V-PCC media tracks can be provided using a box type of '3dpc,' which is not mandatory per sample and can be specified in any quantity per sample. The V-PCC content '3dpc' transform property, when present, can require that the number of input entries num_input is greater or equal to 1, and the input entities are 3D V-PCC visual media tracks (e.g., as discussed in conjunction with FIGS. 10-11). The '3dpc' transform property can specify a derived 3D V-PCC visual media track (e.g., in the form discussed in conjunction with FIGS. 10-11), each of whose component ('pccp', 'pccg', 'pcca' and 'pcco') samples is a composition of corresponding component samples of the input tracks in a given 3D mesh order.

In some embodiments, the component samples of the input visual tracks can be composed respectively, in row-major-column-second order, top-row first, left to right, front to back, in the order they are listed as the input tracks. The value of num_input can be equal to rows*columns*layers. The component samples can be associated, when appropriate, with the same width, height and depth (e.g., specified by the width, height and depth fields). The input component samples, when composed together, can partially and/or fully cover the derived component sample according to the mesh, where width*columns is equal to output_width, height*rows is equal to output_height, and depth*layers is equal to output_depth. Put another way, the derived component sample can be formed by stacking the input component samples into a 3D mesh with a column width equal to width, a row height equal to height, and a layer depth equal to depth, without any gap or overlap. Therefore, the size, depth, and other information can be specified for the 3D cube as well as the elementary content. For example, the position of the 3D sub-volumetric content for the sub-region 608 in FIG. 6 can be specified in terms of a row of 1, column of 2, and depth of 2 (corresponding to the values 0, 1, and 1 for rows_minus_one 1314, columns_minus_one 1316, and layers_minus_one 1318, respectively, in FIG. 13).

FIG. 13 is an exemplary syntax for a 3D point cloud composition, according to some embodiments. In this example, the syntax specifies a V-PCC 3D mesh composition class V-PCC3DMeshComposition class 1300 that extends the TransformProperty ('3dpc'). The version 1302 can be equal to 0 or another number, such that readers can be configured to not process this track derivation with an unrecognized version number. The flag field 1304 can be used to specify the FieldLength field 1306. In some examples, (flags & 1) equal to 0 can specify that the length of the fields output_width 1308, output_height 1310 and output_depth 1312 is 16 bits. As another example, (flags & 1) equal to 1 can specify that the length of the fields output_width 1308, output_height 1310 and output_depth 1312 is 32 bits. Some values of flags can be reserved, suc has reserving the values of flags greater than 1.

The output_width 1308, output_height 1310, and output_depth 1312 can specify the width, height and depth, respectively, of the reconstructed component sample on which the input component samples are placed. The rows_minus_one 1314, columns_minus_one 1316, and layers_minus_one 1318 can specify the number of rows of component samples of the input visual tracks, the number of component samples of the input visual tracks per row and the number of component samples of the input visual tracks per row and column, respectively, where the value is one less than the number of rows, columns or layers, respectively. Component samples of the input visual tracks populate the top row first, followed by the second row, and so on of the front layer, and then the following layers toward back, in the listing order of the input visual tracks.

Figure 14:
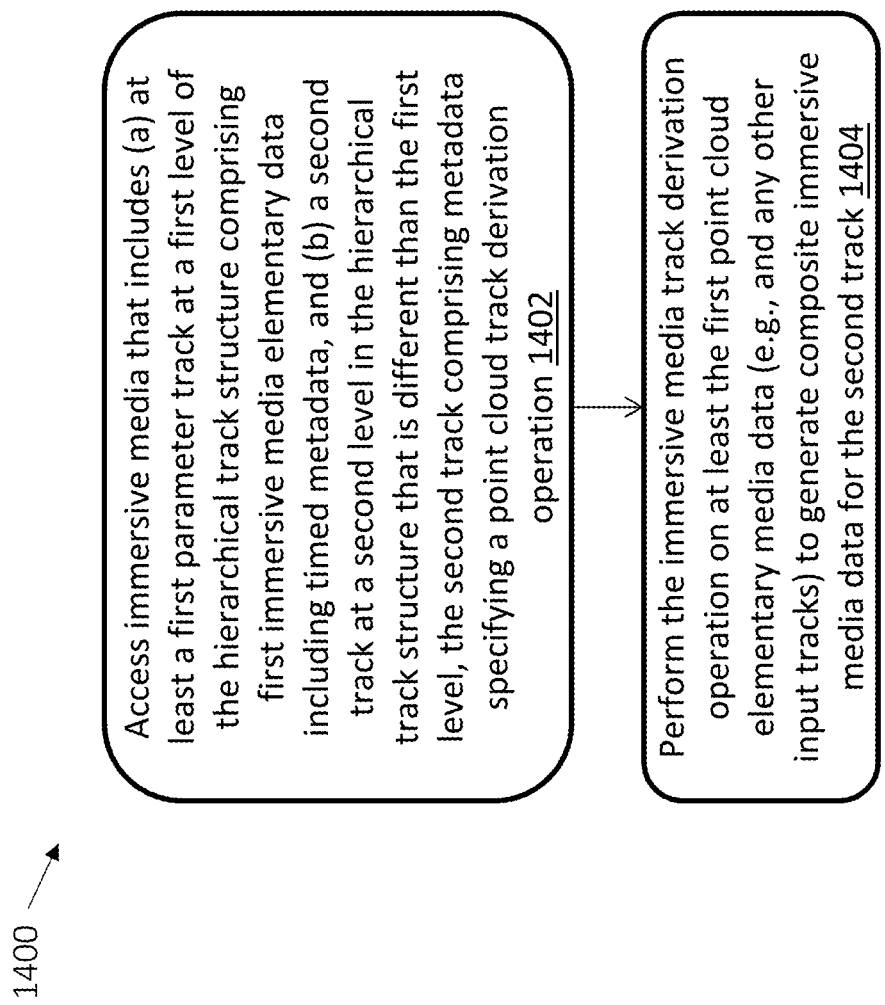
FIG. 14 shows an exemplary method for deriving point cloud video data, according to some embodiments.

FIG. 14 shows an exemplary method 1400 for deriving immersive media (e.g., point cloud video data), according to some embodiments. At step 1402, the device (e.g., the client device 302 in FIG. 3) accesses and/or receives immersive media data (e.g., point cloud contents 304) that includes (a) at least a first track at a first level of the hierarchical track structure comprising first immersive media elementary data (e.g., a parameter track, geometry track, texture track, and/or occupancy track), wherein the first track is a parameter track, and the first immersive media elementary data comprises timed metadata, and (b) a second track at a second level in the hierarchical track structure that is different than the first level of the first track (e.g., is above the first level), the second track comprising metadata specifying an immersive media track derivation operation (e.g., as discussed in conjunction with FIGS. 12-13).

At step 1404, the device performs the point cloud track derivation operation on at least the first immersive media elementary data (e.g., and any other input tracks) to generate composite point immersive media data for the second track. As described herein, the input tracks, which can all be at the same first level of the hierarchical track structure, can include: a parameter track (e.g., 'pccp' track) that includes timed metadata (e.g., parameter sets, auxiliary information, and/or the like), one or more geometry tracks (e.g., 'pccg' tracks) that include geometry data, one or more attribute tracks (e.g., 'pcca' tracks) that include attribute data, and an occupancy track (e.g., 'pcco' track) that includes occupancy map data.

The track derivation operation can be performed on 2D or 3D point cloud content. For 2D point cloud content, for example, each of the input tracks to the track derivation operation can be two-dimensional (2D) sub-picture tracks. The first track and any other input tracks are 2D sub-picture tracks. The metadata specifying the point cloud track derivation operation specifies a 2D point cloud track derivation operation, such that performing the point cloud track derivation includes performing the 2D point cloud track derivation operation on one or more 2D sub-picture tracks to generate a derived 2D point cloud media track for the second track. As described herein (e.g., in conjunction with FIG. 12), the metadata specifying the 2D point cloud track derivation can specify one or more of: a width of a reconstructed component sample of the derived 2D point cloud media track on which samples of at least the 2D sub-picture track are placed for the 2D point cloud track derivation operation, a height of the reconstructed component sample of the derived 2D point cloud media track, a number of rows of input samples of the first input track and any other input tracks, and/or a number of input samples of the first input track and the any other input tracks per row.

For 3D, for example, each of the input tracks to the track derivation operation can be three-dimensional (3D) sub-volumetric tracks. The metadata specifying the point cloud track derivation operation specifies a 3D point cloud track derivation operation, such that performing the point cloud track derivation includes performing the 3D point cloud track derivation operation on at least the 3D sub-volumetric track to generate a derived 3D point cloud media track. As described herein (e.g., in conjunction with FIG. 13), the metadata specifying the 3D point cloud track derivation operation can specify one or more of: a width of a reconstructed component sample of the derived 3D point cloud media track on which samples of at least the 3D sub-volumetric track are placed for the 3D point cloud track derivation operation, a height of the reconstructed component sample of the derived 3D point cloud media track, a depth of the reconstructed component sample of the derived 3D point cloud media track, a number of rows of input samples of the first input track and any other input tracks, a number of input samples of the first input track and the any other input tracks per row, and/or a number of component samples of the first input track and the any other input tracks per row and column.

As described herein (e.g., in conjunction with FIGS. 6-7), the 2D or 3D content can be divided into a hierarchy of elementary tracks and composite tracks. Therefore, the device can repeat the steps shown in FIG. 16, as necessary, to perform a plurality of point cloud derivation operations to generate point cloud media for the various composite tracks of the hierarchy. For a nested composite track, the input tracks can include one or more elementary leaf tracks and one or more non-leaf composite tracks.

As discussed herein, the techniques can be similarly used to encode video content. The techniques can include encoding video data. The method can include encoding immersive media video data comprising encoding immersive media data comprising a hierarchical track structure, comprising encoding at least a first track at a first level of the hierarchical track structure comprising first immersive media elementary data, wherein the first track is a parameter track, and the first immersive media elementary data comprises timed metadata, and a second track at a second level in the hierarchical track structure that is different than the first level of the first track, the second track comprising metadata specifying an immersive media track derivation operation on at least the first immersive media elementary data to generate composite immersive media data for the second track.

In some embodiments, the techniques described herein provide for one or more design features that can be used to enhance the base architecture for derived visual tracks in ISOBMFF. Some examples that follow are discussed in the context of Option 4 for Derived Visual Tracks in the ISOBMFF TuC N18240 to illustrate these features, which is done for exemplary purposes only and is not intended to be limiting. In some examples, the techniques can support a number of track derivation applications, as documented in the TuC and/or proposed in the contributions for OMAF, NBMP, V-PCC, MPEG-I in general, and/or the like. See, for example, m46207, m44800, m47335, as well as m45987, "Temporal Track Derivation in ISOBMFF using the Edit List Mechanism," Marrakech, MA, January 2019 and m44819, "Hierarchical Approach to Immersive Media Content and Metadata Storage, Signalling and Association," October 2018, Macau, Conn., which are hereby incorporated by reference herein in their entirety.

Some embodiments relate to track groups as inputs to track derivation. As stated in Section 2.8.2 of the ISOBMFF TuC, "a derived visual track shall include a TrackReferenceTypeBox with reference_type equal to 'dtrk' listing both the track ID values of all tracks used by derived samples in the track and the item ID values of all image items used by derived samples of the track. An ID value in the 'dtrk' box is resolved to a track ID whenever the file contains a track with such ID, and is resolved to an item ID otherwise."

Since the semantics of track_IDs of the TrackReferenceBox is updated in OMAF (e.g., N18227) to allow containing track_group_id values, it can be more convenient to extend the semantics further to allow containing item_group_id values. In some embodiments, a default ordering of tracks in a track group or items in an item group can be assumed, for instance, to be the "lexicographical order" of the ID values (of type unsigned int(16)) of the tracks or items in their groups, unless stated otherwise in the semantics of a particular track derivation.

Some embodiments relate to applying edit-lists after derivation from input tracks. In the contribution m45987, it was proposed that, if a derived track contains an edit-list, the edit-list should be applied to derived track samples, not to input track samples. This application of edit lists should address the editor's note on the topic in Section 2.8.2 of the TuC N18240.

Some embodiments relate to parametrized track derivation. There can be cases where track derivation depends on some parameter values, which could be provided at the time of derivation. Thus, this kind of parameterized track derivation can result in a family of derived tracks based on the possible parameter values.

An example is a V-PCC visual media track, which can be derived from a parameter track, one of potentially multiple geometry video tracks, one of potentially multiple attribute video tracks, and an occupancy map track. Thus, a V-PCC visual media track can be a derived track, parameterized with parameter values for selecting one geometry video track and one attribute video track to be combined with the parameter track and occupancy map track, in order to derive its samples from those input V-PCC component tracks.

In order to support this kind of parameterized track derivation, the defined "class VisualDerivation" for derivation operations can be allowed to contain, or can be extended with parameters. For example, a "class VisualDerivation (unsigned int(4) geometry_value, unsigned int(4) attribute_value)" with some meaningful values can be used to help select a geometry video track and an attribute video track from their respective collections.

Some embodiments relate to parallel track derivations (e.g., derivation[ ]→derivation[ ][ ]). For example, currently in Section 2.8.2 of the TuC N18240, a "derived sample contains an ordered list of the operations to be performed on an ordered list of input images or samples", and furthermore, it is assumed that each track derivation can take zero or more input tracks and items, but only generates a single output visual track. Put another way, only the first operation in the ordered list of the operations has the flexibility to take zero or more input tracks and items, and each of the rest operations in the ordered list can only take one input track (e.g., which is the output one from its proceeding one). This is rather limited in many cases, for example, where track derivation is used to sub-divide 2D/3D bounding boxes for V-PCC media content in order to 2D sub-picture and 3D sub-region tracks for independent coding units.

According to some embodiments, this can be addressed by allowing track group derivation operations to have a group of one or more output visual tracks (e.g., as proposed in Section 3 of the contribution m44800), which can involve introduction of "unsigned int(16) output_count" and "class VisualDerivationOutputs."

Figure 15:
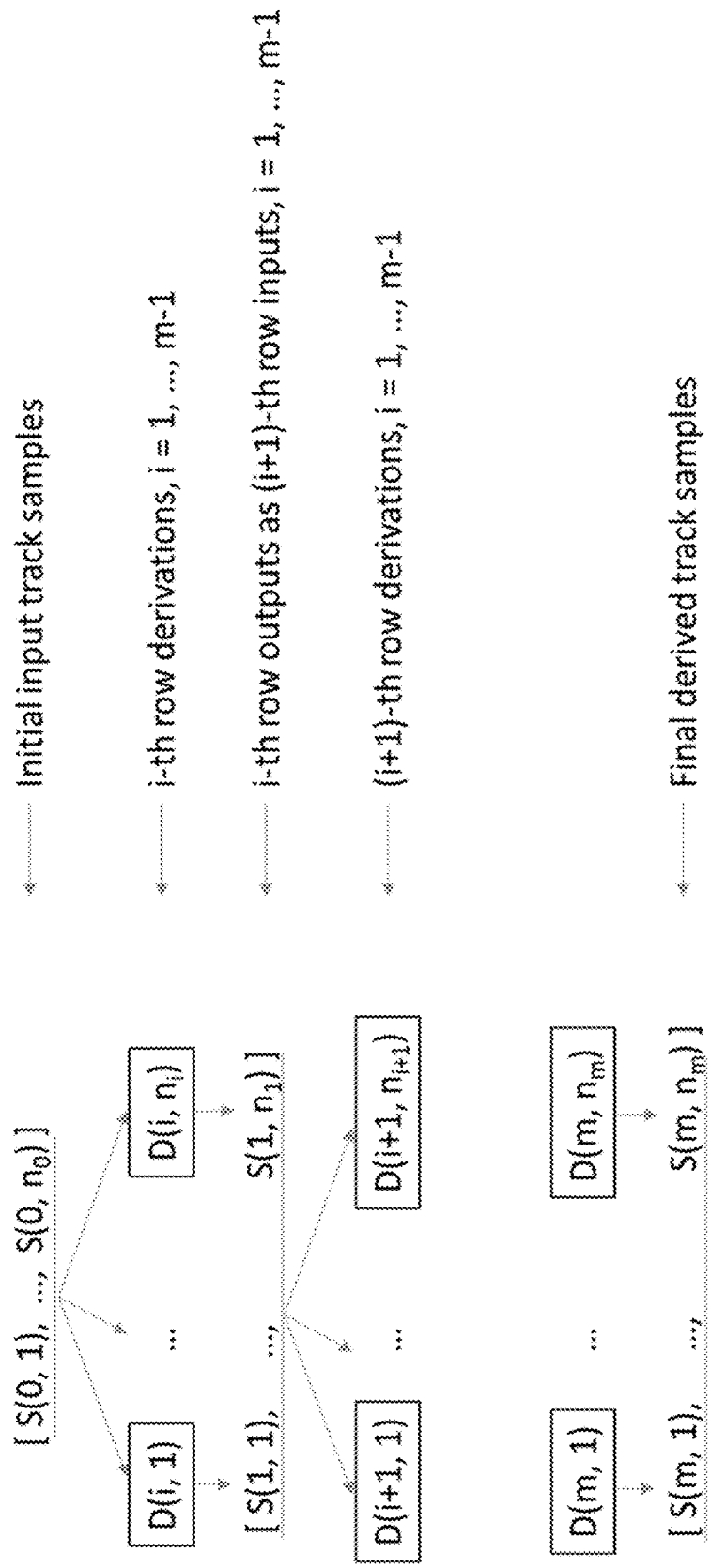
FIG. 15 shows exemplary derivation operations, according to some embodiments.

According to some embodiments, another approach can be to allow a derived sample to contain an ordered list of ordered lists of operations to be performed on an ordered list of input images or samples. In some embodiments, the following syntax for "Sample entry of derived visual track" (Section 2.8.4) and "Sample of derived visual track" (Section 2.8.5) of the TuC N18240) can be changed from VisualDerivation derivations[ ] to VisualDerivation derivations[ ][ ]. In some embodiments, semantically each (row-wise) ordered list in the (column-wise) ordered list represents derivation operations performed in parallel, which take initial input tracks or output tracks from the proceeding (row-wise) list as their input tracks, as illustrated in FIG. 15.

Various exemplary syntaxes and use cases are described herein, which are intended for illustrative purposes and not intended to be limiting. It should be appreciated that only a subset of these exemplary fields may be used for a particular region and/or other fields may be used, and the fields need not include the field names used for purposes of description herein. For example, the syntax may omit some fields and/or may not populate some fields (e.g., or populate such fields with a null value) depending on the type of ROI or viewport. As another example, other syntaxes and/or classes can be used without departing from the spirit of the techniques described herein.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data for immersive media, the method comprising:
   accessing immersive media data comprising a hierarchical track structure comprising at least:
      a first track at a first level of the hierarchical track structure comprising first immersive media elementary data, wherein the first track is a parameter track, and the first immersive media elementary data comprises timed metadata; and
      a second track at a second level in the hierarchical track structure that is different than the first level of the first track, the second track comprising metadata specifying an immersive media track derivation operation; and
   performing the immersive media track derivation operation on at least the first immersive media elementary data to generate composite immersive media data for the second track.

2. The method of claim 1, wherein the immersive media comprises point cloud multimedia.

3. The method of claim 1, wherein:
   the first level of the hierarchical track structure further comprises:
      at least one geometry track comprising geometry data of the immersive media;
      at least one attribute track comprising attribute data of the immersive media; and
      an occupancy track comprising occupancy map data of the immersive media;
   accessing the immersive media data comprises accessing:
      the geometry data in the at least one geometry track;
      the attribute data in the at least one attribute track; and
      the occupancy map data of the occupancy track; and
   performing the immersive media track derivation operation comprises performing the immersive media track derivation operation on the timed metadata, the geometry data, the attribute data, and the occupancy map data, to generate the composite immersive media data for the second track.

4. The method of claim 1, wherein:
   the first immersive media elementary data of the first track comprises a two-dimensional (2D) sub-picture track;
   the metadata specifying the immersive media track derivation operation specifies a 2D immersive media track derivation operation; and
   performing the immersive media track derivation operation comprises performing the 2D immersive media track derivation operation on at least the 2D sub-picture track to generate a derived 2D immersive media track.

5. The method of claim 4, wherein the metadata specifying the 2D immersive media track derivation operation specifies:
   a width of a reconstructed component sample of the derived 2D immersive media track on which samples of at least the 2D sub-picture track are placed for the 2D immersive media track derivation operation; and
   a height of the reconstructed component sample of the derived 2D immersive media track.

6. The method of claim 4, wherein the metadata specifying the 2D immersive media track derivation operation specifies:
   a number of rows of input samples of the first track and any other input tracks; and
   a number of input samples of the first track and the any other input tracks per row.

7. The method of claim 4, wherein the metadata specifying the 2D immersive media track derivation operation specifies:
   a number of rows of input samples of the first track and any other input tracks;
   a number of input samples of the first track and the any other input tracks per row; and
   a number of component samples of the first track and the any other input tracks per row and column.

8. The method of claim 1, wherein:
   the first immersive media elementary data of the first track is a three-dimensional (3D) sub-volumetric track;
   the metadata specifying the immersive media track derivation operation specifies a 3D immersive media track derivation operation; and
   performing the immersive media track derivation operation comprises performing the 3D immersive media track derivation operation on at least the 3D sub-volumetric track to generate a derived 3D immersive media track.

9. The method of claim 8, wherein:
   at least one geometry track comprises geometry data for generating the derived 3D immersive media track;
   at least one attribute track comprises attribute data for generating the derived 3D immersive media track; and
   occupancy track comprises occupancy map data for generating the derived 3D immersive media track.

10. The method of claim 8, wherein the metadata specifying the 3D immersive media track derivation operation specifies:
    a width of a reconstructed component sample of the derived 3D immersive media track on which samples of at least the 3D sub-volumetric track are placed for the 3D immersive media track derivation operation;
    a height of the reconstructed component sample of the derived 3D immersive media track; and
    a depth of the reconstructed component sample of the derived 3D immersive media track.

11. A method for encoding video data, the method comprising:
    encoding immersive media video data comprising encoding immersive media data comprising a hierarchical track structure, comprising encoding at least:
       a first track at a first level of the hierarchical track structure comprising first immersive media elementary data, wherein the first track is a parameter track, and the first immersive media elementary data comprises timed metadata; and
       a second track at a second level in the hierarchical track structure that is different than the first level of the first track, the second track comprising metadata specifying an immersive media track derivation operation on at least the first immersive media elementary data to generate composite immersive media data for the second track.

12. An apparatus configured to decode video data, the apparatus comprising a processor in communication with memory, the processor being configured to execute instructions stored in the memory that cause the processor to perform:
    accessing immersive media data comprising a hierarchical track structure comprising at least:
       a first track at a first level of the hierarchical track structure comprising first immersive media elementary data, wherein the first track is a parameter track, and the first immersive media elementary data comprises timed metadata; and a second track at a second level in the hierarchical track structure that is different than the first level of the first track, the second track comprising metadata specifying an immersive media track derivation operation; and performing the immersive media track derivation operation on at least the first immersive media elementary data to generate composite immersive media data for the second track.

13. The apparatus of claim 12, wherein the immersive media data comprises point cloud multimedia.

14. The apparatus of claim 12, wherein:
the first level of the hierarchical track structure further comprises:
at least one geometry track comprising geometry data of the immersive media data;
at least one attribute track comprising attribute data of the immersive media data; and
an occupancy track comprising occupancy map data of the immersive media data;
accessing the immersive media data comprises accessing:
the geometry data in the at least one geometry track;
the attribute data in the at least one attribute track; and
the occupancy map data of the occupancy track; and
performing the immersive media track derivation operation comprises performing the immersive media track derivation operation on the timed metadata, the geometry data, the attribute data, and the occupancy map data, to generate the composite immersive media data for the second track.

15. The apparatus of claim 12, wherein:
the first immersive media elementary data of the first track comprises a two-dimensional (2D) sub-picture track;
the metadata specifying the immersive media track derivation operation specifies a 2D immersive media track derivation operation; and
performing the immersive media track derivation operation comprises performing the 2D immersive media track derivation operation on at least the 2D sub-picture track to generate a derived 2D immersive media track.

16. The apparatus of claim 15, wherein the metadata specifying the 2D immersive media track derivation operation specifies:

a width of a reconstructed component sample of the derived 2D immersive media track on which samples of at least the 2D sub-picture track are placed for the 2D immersive media track derivation operation; and
a height of the reconstructed component sample of the derived 2D immersive media track.

17. The apparatus of claim 15, wherein the metadata specifying the 2D immersive media track derivation operation specifies:
a number of rows of input samples of the first track and any other input tracks; and
a number of input samples of the first track and the any other input tracks per row.

18. The apparatus of claim 12, wherein:
the first immersive media elementary data of the first track is a three-dimensional (3D) sub-volumetric track;
the metadata specifying the immersive media track derivation operation specifies a 3D immersive media track derivation operation; and
performing the immersive media track derivation operation comprises performing the 3D immersive media track derivation operation on at least the 3D sub-volumetric track to generate a derived 3D immersive media track.

19. The apparatus of claim 18, wherein:
at least one geometry track comprises geometry data for generating the derived 3D immersive media track;
at least one attribute track comprises attribute data for generating the derived 3D immersive media track; and
occupancy track comprises occupancy map data for generating the derived 3D immersive media track.

20. The apparatus of claim 18, wherein the metadata specifying the 3D immersive media track derivation operation specifies:
a width of a reconstructed component sample of the derived 3D immersive media track on which samples of at least the 3D sub-volumetric track are placed for the 3D immersive media track derivation operation;
a height of the reconstructed component sample of the derived 3D immersive media track; and
a depth of the reconstructed component sample of the derived 3D immersive media track.

* * * * *